(12) United States Patent
Nishikawa

(10) Patent No.: US 11,003,061 B2
(45) Date of Patent: May 11, 2021

(54) IMAGE DISPLAY APPARATUS AND PROJECTION OPTICAL SYSTEM

(71) Applicant: SONY CORPORATION, Tokyo (JP)

(72) Inventor: Jun Nishikawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 61 days.

(21) Appl. No.: 16/318,870

(22) PCT Filed: Jul. 3, 2017

(86) PCT No.: PCT/JP2017/024315
§ 371 (c)(1),
(2) Date: Jan. 18, 2019

(87) PCT Pub. No.: WO2018/042865
PCT Pub. Date: Mar. 8, 2018

(65) Prior Publication Data
US 2019/0219905 A1 Jul. 18, 2019

(30) Foreign Application Priority Data

Aug. 30, 2016 (JP) .............................. JP2016-168343

(51) Int. Cl.
*G03B 21/14* (2006.01)
*G02B 13/16* (2006.01)
(Continued)

(52) U.S. Cl.
CPC ........... *G03B 21/142* (2013.01); *G02B 13/16* (2013.01); *G02B 17/08* (2013.01); *G03B 21/00* (2013.01); *G03B 21/14* (2013.01); *G03B 21/28* (2013.01)

(58) Field of Classification Search
CPC ....... G03B 21/14; G03B 21/142; G02B 13/16
(Continued)

(56) References Cited

U.S. PATENT DOCUMENTS 8,292,438 B2 * 10/2012 Nishikawa ........... H04N 9/3105
353/101
8,908,292 B2 * 12/2014 Chou ..................... G02B 13/18
359/717
(Continued)

FOREIGN PATENT DOCUMENTS

JP 2009-258389 A 11/2009
JP 2010-122573 A 6/2010
(Continued)

OTHER PUBLICATIONS

International Search Report dated Sep. 26, 2017 in PCT/JP2017/024315 filed on Jul. 3, 2017.

*Primary Examiner* — William C. Dowling
(74) *Attorney, Agent, or Firm* — Oblon, McClelland, Maier & Neustadt, L.L.P.

(57) ABSTRACT

According to an embodiment of the present technology, an image display apparatus includes a light source; an image generation unit; and a projection optical system. The image generation unit generates image light by modulating a light beam emitted from the light source. The projection optical system includes a first lens group that is disposed on an optical axis of the generated image light and has a first refractive power, a second lens group that is disposed on the optical axis and has a second refractive power, a first movement mechanism that moves the first lens group, and a second movement mechanism that moves the second lens group corresponding to the first refractive power, the second refractive power, and the movement of the first lens group.

13 Claims, 25 Drawing Sheets

(51) Int. Cl.
  *G03B 21/00*  (2006.01)
  *G02B 17/08*  (2006.01)
  *G03B 21/28*  (2006.01)

(58) Field of Classification Search
  USPC .......................................................... 353/101
  See application file for complete search history.

(56) References Cited

U.S. PATENT DOCUMENTS

| | | |
|---|---|---|
| 2009/0262425 A1 | 10/2009 | Kimura |
| 2010/0128234 A1 | 5/2010 | Nishikawa |
| 2011/0149411 A1* | 6/2011 | Inoko .................... G02B 13/16 |
| | | 359/680 |
| 2015/0097977 A1 | 4/2015 | Watanabe |
| 2016/0238825 A1 | 8/2016 | Minefuji |
| 2017/0153427 A1* | 6/2017 | Masui .................... G02B 15/16 |
| 2019/0235206 A1* | 8/2019 | Ichimura ............. H04N 5/2254 |

FOREIGN PATENT DOCUMENTS

| | | |
|---|---|---|
| JP | 2013-3297 A | 1/2013 |
| JP | 5365155 B2 | 12/2013 |
| JP | 2015-75617 A | 4/2015 |
| JP | 2015-132723 A | 7/2015 |
| JP | 2016-151686 A | 8/2016 |

\* cited by examiner

| | |
|---|---|
| Numerical aperture NA on primary image surface side | 0.163 |
| Maximum half angle of view ω | 76deg. |
| Maximum object height y | 13.6mm |

FIG.4

| | |
|---|---|
| Length in lateral direction | 16.6mm |
| Length in longitudinal direction | 8.7mm |
| Distance between optical axis and device center | 6.4mm |

FIG.5

| | SF | MF | r (mm) | d (mm) | nd | νd | Remarks |
|---|---|---|---|---|---|---|---|
| Primary image surface | | | inf | 9.7 | | | |
| s1 | | | inf | 10.0 | 1.517 | 64 | Combining prism, etc |
| s2 | | | inf | 54.0 | 1.841 | 25 | |
| s3 | | | inf | 3.0 | | | |
| s4 | | | 29.83 | 11.2 | 1.487 | 70 | |
| s5 | | | −209.77 | 3.1 | | | |
| s6 | | | 28.95 | 9.0 | 1.487 | 70 | |
| s7 | | | −54.59 | 1.4 | 1.801 | 35 | |
| s8 | | | 18.93 | 8.3 | 1.487 | 70 | |
| s9 | | | −41.87 | 3.2 | | | |
| s10 | | | −24.32 | 1.1 | 1.801 | 35 | |
| s11 | | | 31.62 | 5.7 | 1.808 | 23 | |
| s12 | | | −44.86 | (d1) | | | |
| s14 | (p1) | | 57.23 | 1.5 | 1.596 | 39 | |
| s15 | | | 37.64 | 2.4 | | | |
| s16 | | | 44.74 | 4.0 | 1.517 | 64 | |
| s17 | | (p2) | −123.70 | (d2) | | | |
| s18 | | | 55.26 | 5.4 | 1.567 | 43 | |
| s19 | | | −158.25 | 8.1 | | | |
| s20 * | | | −52.93 | 3.5 | 1.583 | 59 | |
| s21 * | | | −198.61 | 23.6 | | | |
| s22 | | | 1739.65 | 3.0 | 1.773 | 50 | |
| s23 | | | 45.77 | 17.8 | | | |
| s24 | | | 355.11 | 7.3 | 1.567 | 43 | |
| s25 | | | −195.90 | 20.0 | | | |
| s26 * | | | 2.97 | 5.4 | 1.509 | 56 | |
| s27 * | | | 1.12 | 164.7 | | | |
| s28 * | | | −27.46 | −631.4 | | | Curved reflective surface |
| Secondary image surface | | | inf | | | | |

\* ⋯ Aspherical surface

FIG.6

| | s20 | s21 | s26 | s27 | s28 |
|---|---|---|---|---|---|
| K | 5.07 | 0.00 | -1.00 | -1.00 | -1.03 |
| A(1) | 0.00E+00 | 0.00E+00 | 0.00E+00 | 0.00E+00 | 0.00E+00 |
| A(2) | -4.51E-03 | 0.00E+00 | -1.68E-01 | -4.47E-01 | 8.56E-03 |
| A(3) | 1.89E-04 | 2.25E-04 | 7.38E-05 | -1.58E-04 | 3.32E-05 |
| A(4) | -1.36E-04 | -1.61E-04 | -3.24E-05 | 3.32E-04 | -2.31E-07 |
| A(5) | 1.33E-05 | 1.64E-05 | -1.27E-06 | -7.28E-06 | 1.20E-09 |
| A(6) | -3.47E-07 | -8.12E-07 | -2.94E-08 | -8.72E-08 | -5.64E-11 |
| A(7) | -3.85E-08 | 7.85E-09 | 2.32E-09 | 3.64E-09 | 1.65E-12 |
| A(8) | 4.27E-09 | 9.12E-10 | 2.24E-10 | 9.39E-11 | -2.55E-14 |
| A(9) | -2.50E-10 | -2.46E-11 | -1.36E-11 | -2.17E-12 | 1.41E-16 |
| A(10) | 1.43E-11 | -8.57E-14 | 2.11E-13 | -9.48E-14 | 3.13E-19 |
| A(11) | -5.66E-13 | 0.00E+00 | 1.13E-16 | 2.99E-15 | 1.70E-21 |
| A(12) | 8.84E-15 | 0.00E+00 | -1.83E-17 | 0.00E+00 | -1.35E-22 |
| A(13) | 0.00E+00 | 0.00E+00 | 0.00E+00 | 0.00E+00 | 1.04E-24 |
| A(14) | 0.00E+00 | 0.00E+00 | 0.00E+00 | 0.00E+00 | -2.49E-27 |

FIG.7

| | Shift on lower side of screen | | Shift on upper side of screen | | Shift on left side of screen | | Shift on lower left side of screen | | Shift on upper left side of screen | |
|---|---|---|---|---|---|---|---|---|---|---|
| | x | y | x | y | x | y | x | y | x | y |
| (p1) | 0.00 | 1.81 | 0.00 | -1.81 | 1.81 | 1.28 | 1.28 | 1.28 | -1.28 |
| (p2) | 0.00 | -0.74 | 0.00 | 0.74 | -0.74 | 0.00 | -0.53 | -0.53 | -0.53 | 0.53 |

Unit[mm]

FIG.8

|  | Enlarging side | Middle | Reducing side |
|---|---|---|---|
| (d1) | 14.4 | 15.7 | 17.0 |
| (d2) | 41.2 | 39.9 | 38.6 |
| (p1) | 0.3 | 0.0 | −0.3 |
| (p2) | −0.1 | 0.0 | 0.1 |

Unit[mm]

FIG.9

| $\phi 1$ |  | 0.032 |
|---|---|---|
| $\phi p1$ |  | 0.010 |
| $\phi p2$ |  | 0.014 |
| $\phi p3$ |  | − |
| Mp1 | mm | −1.81 |
| Mp2 | mm | 0.74 |
| Mp3 | mm | − |

FIG.10

| $\phi p1/\phi 1$ | 0.33 |
|---|---|
| $\phi p2/\phi 1$ | 0.43 |
| $\phi p3/\phi 1$ | − |
| $\phi p1/\phi p2$ | 0.76 |
| $\phi p1/\phi p3$ | − |
| Mp1/Mp2 | −2.43 |
| Mp1/Mp3 | − |

| Primary image surface | SF | MF | r (mm) | d (mm) | nd | νd | Remarks |
|---|---|---|---|---|---|---|---|
| s1 | | | inf | 9.7 | | | Combining prism, etc |
| s2 | | | inf | 10.0 | 1.517 | 64 | |
| s3 | | | inf | 54.0 | 1.841 | 25 | |
| s4 | | | inf | 3.0 | | | |
| s5 | | | 32.26 | 11.2 | 1.487 | 70 | |
| s6 | | | -151.31 | 1.5 | | | |
| s7 | | | 31.52 | 9.0 | 1.487 | 70 | |
| s8 | | | -104.84 | 1.4 | 1.801 | 35 | |
| s9 | | | 19.94 | 8.3 | 1.487 | 70 | |
| s10 | | | -40.33 | 3.2 | | | |
| s11 | | | -24.52 | 1.1 | 1.801 | 35 | |
| s12 | | | 37.36 | 5.7 | 1.808 | 23 | |
| s13 | | | -48.56 | 17.7 | | | |
| s14 | (p1) | | 57.23 | 1.5 | 1.596 | 39 | |
| s15 | | | 37.64 | 2.4 | | | |
| s16 | | | 44.74 | 4.0 | 1.517 | 64 | |
| s17 | | | -123.70 | 41.2 | | | |
| s18 | (p2) | | 55.26 | 5.4 | 1.567 | 43 | |
| s19 | | | -158.25 | 8.1 | | | |
| s20 | * | | -52.93 | 3.5 | 1.583 | 59 | |
| s21 | * | | -198.61 | 23.6 | | | |
| s22 | | | 1739.65 | 3.0 | 1.773 | 50 | |
| s23 | | | 45.77 | 17.8 | | | |
| s24 | | | 355.11 | 7.3 | 1.567 | 43 | |
| s25 | | | -195.90 | 20.0 | | | |
| s26 | * | | 2.97 | 5.4 | 1.509 | 56 | |
| s27 | * | | 1.12 | 163.0 | | | |
| s28 | * | | -27.46 | -634.0 | | | |
| Secondary image surface | | | inf | | | | Curved reflective surface |

* ··· Aspherical surface

| | s20 | s21 | s26 | s27 | s28 |
|---|---|---|---|---|---|
| K | 6.95 | 0.02 | -1.00 | -1.00 | -0.99 |
| A( 1) | 0.00E+00 | 0.00E+00 | 0.00E+00 | 0.00E+00 | 0.00E+00 |
| A( 2) | -4.46E-03 | 0.00E+00 | -1.74E-01 | -4.15E-01 | 7.70E-03 |
| A( 3) | 2.16E-04 | 0.00E+00 | -4.54E-04 | -6.04E-04 | 7.74E-05 |
| A( 4) | -1.48E-04 | 2.52E-04 | 1.55E-05 | 3.16E-04 | -4.64E-07 |
| A( 5) | 1.43E-05 | -1.84E-04 | -2.94E-06 | -6.64E-06 | 2.82E-09 |
| A( 6) | -3.01E-07 | 1.74E-05 | -1.08E-08 | -9.66E-08 | -4.61E-11 |
| A( 7) | -3.53E-08 | -7.12E-07 | 2.52E-09 | 3.69E-09 | 1.63E-12 |
| A( 8) | 4.34E-09 | 7.41E-09 | 2.20E-10 | 9.75E-11 | -2.60E-14 |
| A( 9) | -2.62E-10 | 6.55E-10 | -1.37E-11 | -2.15E-12 | 1.39E-16 |
| A(10) | 1.30E-11 | -3.40E-11 | 2.12E-13 | -9.68E-14 | 3.28E-19 |
| A(11) | -5.98E-13 | 5.57E-13 | 1.36E-16 | 2.94E-15 | 1.85E-21 |
| A(12) | 1.45E-14 | 0.00E+00 | -1.94E-17 | -2.15E-17 | -1.35E-22 |
| A(13) | 0.00E+00 | 0.00E+00 | 0.00E+00 | 0.00E+00 | 1.04E-24 |
| A(14) | 0.00E+00 | 0.00E+00 | 0.00E+00 | 0.00E+00 | -2.49E-27 |

FIG.24

|  | Shift on lower side of screen | | Shift on upper side of screen | | Shift on left side of screen | | Shift on lower left side of screen | | Shift on upper left side of screen | |
|---|---|---|---|---|---|---|---|---|---|---|
|  | x | y | x | y | x | y | x | y | x | y |
| (p1) | 0.00 | 2.24 | 0.00 | -2.24 | 2.24 | 0.00 | 1.58 | 1.58 | 1.58 | -1.58 |
| (p2) | 0.00 | 0.97 | 0.00 | -0.97 | 0.97 | 0.00 | 0.69 | 0.69 | 0.69 | -0.69 |

Unit[mm]

FIG.25

| $\phi 1$ |  | 0.032 |
|---|---|---|
| $\phi p1$ |  | 0.011 |
| $\phi p2$ |  | −0.011 |
| $\phi p3$ |  | − |
| Mp1 | mm | 2.24 |
| Mp2 | mm | 0.97 |
| Mp3 | mm | − |

FIG.26

| $\phi p1/\phi 1$ | 0.36 |
|---|---|
| $\phi p2/\phi 1$ | −0.33 |
| $\phi p3/\phi 1$ | − |
| $\phi p1/\phi p2$ | −1.06 |
| $\phi p1/\phi p3$ | − |
| Mp1/Mp2 | 2.30 |
| Mp1/Mp3 | − |

| | SF | MF | r (mm) | d (mm) | nd | νd | Remarks |
|---|---|---|---|---|---|---|---|
| Primary image surface | | | | | | | |
| s1 | | | inf | 9.7 | | | |
| s2 | | | inf | 10.0 | 1.517 | 64 | Combining prism, etc |
| s3 | | | inf | 54.0 | 1.841 | 25 | |
| s4 | | | inf | 3.0 | | | |
| s5 | | | 29.82 | 11.2 | 1.487 | 70 | |
| s6 | | | −159.84 | 2.4 | | | |
| s7 | | | 29.88 | 9.0 | 1.487 | 70 | |
| s8 | | | −51.60 | 1.4 | 1.801 | 35 | |
| s9 | | | 19.45 | 8.3 | 1.487 | 70 | |
| s10 | | | −41.74 | 3.2 | | | |
| s11 | | | −24.17 | 1.1 | 1.801 | 35 | |
| s12 | | | 31.43 | 5.7 | 1.808 | 23 | |
| s14 | (p1) | | −45.66 | 16.4 | | | |
| s15 | | | 53.45 | 1.5 | 1.596 | 39 | |
| s16 | | | 35.92 | 2.4 | | | |
| s17 | (p2) | | 43.26 | 4.0 | 1.517 | 64 | |
| s18 | | | −109.50 | 40.1 | | | |
| s19 | (p3) | | 50.74 | 5.4 | 1.567 | 43 | |
| s20 * | | | −144.41 | 8.1 | | | |
| s21 * | | | −50.44 | 3.5 | 1.583 | 59 | |
| s22 | | | 295.54 | 23.6 | | | |
| s23 | | | 186.15 | 3.0 | 1.773 | 50 | |
| s24 | | | 45.59 | 17.8 | | | |
| s25 | | | −2329.15 | 7.3 | 1.567 | 43 | |
| s26 * | | | −138.25 | 20.0 | | | |
| s27 * | | | 3.00 | 5.4 | 1.509 | 56 | |
| s28 * | | | 1.16 | 164.1 | | | |
| | | | −27.59 | 636.2 | | | Curved reflective surface |
| Secondary image surface | | | inf | | | | |

* ... Aspherical surface

| s20 | | s21 | | s26 | | s27 | | s28 | |
|---|---|---|---|---|---|---|---|---|---|
| K | 3.36 | K | 0.00 | K | -1.00 | K | -1.00 | K | -1.01 |
| A( 1) | 0.00E+00 | A( 1) | 0.00E+00 | A( 1) | 0.00E+00 | A( 1) | 0.00E+00 | A( 1) | 0.00E+00 |
| A( 2) | -5.08E-03 | A( 2) | 0.00E+00 | A( 2) | -1.66E-01 | A( 2) | -4.30E-01 | A( 2) | 8.13E-03 |
| A( 3) | 2.09E-04 | A( 3) | 2.49E-04 | A( 3) | -2.32E-04 | A( 3) | -4.80E-04 | A( 3) | 4.78E-05 |
| A( 4) | -1.41E-04 | A( 4) | -1.68E-04 | A( 4) | -1.95E-05 | A( 4) | 3.37E-04 | A( 4) | -2.64E-07 |
| A( 5) | 1.34E-05 | A( 5) | 1.67E-05 | A( 5) | -1.33E-06 | A( 5) | -7.26E-06 | A( 5) | 1.39E-09 |
| A( 6) | -3.31E-07 | A( 6) | -7.77E-07 | A( 6) | -2.66E-08 | A( 6) | -9.14E-08 | A( 6) | -5.39E-11 |
| A( 7) | -3.71E-08 | A( 7) | 8.37E-09 | A( 7) | 2.28E-09 | A( 7) | 3.66E-09 | A( 7) | 1.65E-12 |
| A( 8) | 4.34E-09 | A( 8) | 8.56E-10 | A( 8) | 2.21E-10 | A( 8) | 9.56E-11 | A( 8) | -2.56E-14 |
| A( 9) | -2.51E-10 | A( 9) | -2.75E-11 | A( 9) | -1.36E-11 | A( 9) | -2.15E-12 | A( 9) | 1.40E-16 |
| A(10) | 1.38E-11 | A(10) | 3.93E-15 | A(10) | 2.12E-13 | A(10) | -9.53E-14 | A(10) | 3.14E-19 |
| A(11) | -5.95E-13 | A(11) | 0.00E+00 | A(11) | 1.61E-16 | A(11) | 2.97E-15 | A(11) | 1.75E-21 |
| A(12) | 1.07E-14 | A(12) | 0.00E+00 | A(12) | -1.92E-17 | A(12) | -2.23E-17 | A(12) | -1.35E-22 |
| A(13) | 0.00E+00 | A(13) | 0.00E+00 | A(13) | 0.00E+00 | A(13) | 0.00E+00 | A(13) | 1.04E-24 |
| A(14) | 0.00E+00 | A(14) | 0.00E+00 | A(14) | 0.00E+00 | A(14) | 0.00E+00 | A(14) | -2.49E-27 |

FIG.30

|  | Shift on lower side of screen | | Shift on upper side of screen | | Shift on left side of screen | | Shift on lower left side of screen | | Shift on upper left side of screen | |
|---|---|---|---|---|---|---|---|---|---|---|
|  | x | y | x | y | x | y | x | y | x | y |
| (p1) | 0.00 | 1.99 | 0.00 | −1.99 | 1.99 | 0.00 | 1.41 | 1.41 | 1.41 | −1.41 |
| (p2) | 0.00 | −0.76 | 0.00 | 0.76 | −0.76 | 0.00 | −0.54 | −0.54 | −0.54 | 0.54 |
| (p3) | 0.00 | 0.20 | 0.00 | −0.20 | 0.20 | 0.00 | 0.14 | 0.14 | 0.14 | −0.14 |

Unit[mm]

FIG.31

| $\phi 1$ |  | 0.035 |
|---|---|---|
| $\phi p1$ |  | 0.011 |
| $\phi p2$ |  | 0.015 |
| $\phi p3$ |  | −0.020 |
| Mp1 | mm | 1.99 |
| Mp2 | mm | −0.76 |
| Mp3 | mm | 0.20 |

FIG.32

| $\phi p1/\phi 1$ | 0.33 |
|---|---|
| $\phi p2/\phi 1$ | 0.43 |
| $\phi p3/\phi 1$ | −0.57 |
| $\phi p1/\phi p2$ | 0.76 |
| $\phi p1/\phi p3$ | −0.58 |
| Mp1/Mp2 | −2.61 |
| Mp1/Mp3 | 9.76 |

FIG.33

|  |  | First embodiment | Second embodiment | Third embodiment |
|---|---|---|---|---|
| $\phi 1$ |  | 0.032 | 0.032 | 0.035 |
| $\phi p1$ |  | 0.010 | 0.011 | 0.011 |
| $\phi p2$ |  | 0.014 | −0.011 | 0.015 |
| $\phi p3$ |  | − | − | −0.02 |
| Mp1 | mm | 1.81 | 2.24 | 1.99 |
| Mp2 | mm | −0.74 | 0.97 | −0.76 |
| Mp3 | mm | − | − | 0.20 |

FIG.34

|  | Lower limit | Upper limit | First embodiment | Second embodiment | Third embodiment |
|---|---|---|---|---|---|
| $|\phi p1/\phi 1|$ | 0.1 | 5 | 0.33 | 0.36 | 0.33 |
| $|\phi p2/\phi 1|$ | 0.1 | 5 | 0.43 | −0.33 | 0.43 |
| $|\phi p3/\phi 1|$ | 0.1 | 5 | − | − | −0.57 |
| $|\phi p1/\phi p2|$ | 0.1 | 5 | 0.76 | −1.06 | 0.76 |
| $|\phi p1/\phi p3|$ | 0.1 | 5 | − | − | −0.58 |
| $|Mp1/Mp2|$ | 0.1 | 20 | −2.43 | 2.30 | −2.61 |
| $|Mp1/Mp3|$ | 0.1 | 20 | − | − | 9.76 |

FIG.35

IMAGE DISPLAY APPARATUS AND PROJECTION OPTICAL SYSTEM

TECHNICAL FIELD

The present technology relates to an image display apparatus such as a projector, and to a projection optical system.

BACKGROUND ART

In the past, a projector has been widely known as a projection type image display apparatus that displays a projection image on a screen. Recently, there is a growing demand for a front projection type projector having an ultra-wide angle, which is capable of displaying a large screen even in the case where the projection space is small. By using this projector, it is possible to project a larger screen also in a limited space by projecting it obliquely and at a wide angle on a screen.

Meanwhile, in the case of using a projection type projector having an ultra-wide angle, the image position, the image size, and the like on the screen is often greatly changed by a slight change in the distance between the projector and the screen. Therefore, it is difficult to finely adjust the image position and the like when projecting an image.

In the projection type projector having an ultra-wide angle described in Patent Literature 1, a screen shift for moving the projection image to be projected on the screen can be performed by moving a part of optical components included in the projection optical system. By using this screen shift, fine adjustment of the image position and the like can be easily performed (paragraphs [0023] and [0024] of the specification of Patent Literature 1).

CITATION LIST

Patent Literature

Patent Literature 1: Japanese Patent No. 5365155

DISCLOSURE OF INVENTION

Technical Problem

A projector that supports an ultra-wide angle is considered to become popular in the future. There is a demand for a technology that enables, when projecting an image with high luminance and high resolution, fine adjustment of the image position and the like without deteriorating the image.

In view of the circumstances as described above, it is an object of the present technology to provide an image display apparatus and a projection optical system capable of adjusting the image position without deteriorating the image.

Solution to Problem

In order to achieve the above-mentioned object, an image display apparatus according to an embodiment of the present technology includes a light source; an image generation unit; and a projection optical system.

The image generation unit generates image light by modulating a light beam emitted from the light source.

The projection optical system includes a first lens group that is disposed on an optical axis of the generated image light and has a first refractive power, a second lens group that is disposed on the optical axis and has a second refractive power, a first movement mechanism that moves the first lens group, and a second movement mechanism that moves the second lens group corresponding to the first refractive power, the second refractive power, and the movement of the first lens group.

In this image display apparatus, the image light generated by modulating the light beam emitted from the light source is projected from the projection optical system via the first lens group having the first refractive power and the second lens group having the second refractive power. At this time, the second lens group is moved by the second movement mechanism corresponding to the first refractive power, the second refractive power, and the movement of the first lens group by the first movement mechanism. Accordingly, it is possible to adjust the image position without deteriorating the image.

The first movement mechanism may move the first lens group in a first orientation along a direction substantially perpendicular to the optical axis. In this case, the second movement mechanism may move the second lens group in a second orientation corresponding to the first refractive power, the second refractive power, and the first orientation along the direction substantially perpendicular to the optical axis.

Accordingly, it is possible to adjust the image to be projected, in two stages. Accordingly, it is possible to shift the image position without deteriorating the image.

The second orientation may be opposite to the first orientation in a case where the first and second refractive powers have the same sign.

Accordingly, it is possible to properly correct deterioration of the image due to the movement of one lens group, by the movement of the other lens group. Accordingly, it is possible to suppress deterioration of the image.

The second orientation may be the same orientation as the first orientation in a case where the first and second refractive powers have different signs.

Accordingly, it is possible to properly correct deterioration of the image due to the movement of one lens group, by the movement of the other lens group. Accordingly, it is possible to suppress deterioration of the image.

The projection optical system may include a first optical system that includes the first and second lens groups and has a positive refractive power as a whole, and a second optical system that includes a concave reflecting surface reflecting the image light emitted from the first optical system.

Accordingly, it is possible to project image light at an ultra-wide angle. Accordingly, for example, it is possible to display a large screen even in the case where the distance between the projector and the screen is short.

The projection optical system may be configured so that the first refractive power $\varphi p1$, the second refractive power $\varphi p2$, a refractive power $\varphi 1$ of the first optical system at reference projection, a movement amount $Mp1$ of the first lens group, and a movement amount $Mp2$ of the second lens group satisfy relationships of $$0.1 < |\varphi p1/\varphi p2| < 5.0, \tag{1}$$

$$0.1 < |Mp1/Mp2| < 20, \tag{2}$$

$$0.1 < |\varphi p1/\varphi 1| < 5.0, \text{ and} \tag{3}$$

$$0.1 < |\varphi p2/\varphi 1| < 5.0. \tag{4}$$

Accordingly, it is possible to sufficiently suppress deterioration of the image and adjust the image position.

The first lens group may be moved along a direction substantially perpendicular to the optical axis by the largest amount. In this case, the second lens group may be moved along the direction substantially perpendicular to the optical axis by the second largest amount.

Accordingly, it is possible to efficiently adjust the image position while suppressing deterioration of the image.

The first and second movement mechanisms may move the first and second lens groups in conjunction with each other.

Accordingly, it is possible to properly control the movement amount of each lens group, and the like. Accordingly, it is possible to easily adjust the image position without deteriorating the image.

The first optical system may include at least one lens group that is moved along a direction substantially in parallel with the optical axis. In this case, the first and second movement mechanisms may move the first and second lens groups in conjunction with the movement of the at least one lens group along the direction substantially in parallel with the optical axis.

Accordingly, it is possible to enlarge and reduce the image without displacing the image position.

The projection optical system may include a third lens group that is included in the first optical system and has a third refractive power, and a third movement mechanism that moves the third lens group.

Accordingly, it is possible to adjust the image to be projected, in three stages. Accordingly, for example, it is possible to widen the shift range of the image position.

The projection optical system may be configured so that the first refractive power φp1, the third refractive power φp3, a movement amount Mp1 of the first lens group, and a movement amount Mp3 of the third lens group satisfy relationships of $$0.1 < |\varphi p1/\varphi p3| < 5.0, \text{ and} \quad (5)$$

$$0.1 < |Mp1/Mp3| < 20. \quad (6)$$

Accordingly, it is possible to sufficiently suppress deterioration of the image and adjust the image position.

The first lens group may be moved along a direction substantially perpendicular to the optical axis by the largest amount. In this case, the second lens group may be moved along the direction substantially perpendicular to the optical axis by the second largest amount. Further, the third lens group may be moved along the direction substantially perpendicular to the optical axis by the third largest amount.

Accordingly, it is possible to efficiently adjust the image position while suppressing deterioration of the image.

A projection optical system according to an embodiment of the present technology is a projection optical system that projects image light obtained by modulating a light beam emitted from a light source, the projection optical system including: a first lens group; a second lens group; a first movement mechanism; and a second movement mechanism.

The first lens group is disposed on an optical axis of the image light and has a first refractive power.

The second lens group is disposed on the optical axis and has a second refractive power.

The first movement mechanism moves the first lens group.

The second movement mechanism moves the second lens group corresponding to the first refractive power, the second refractive power, and the movement of the first lens group.

Advantageous Effects of Invention

As described above, according to the present technology, it is possible to adjust the image position without deteriorating the image. It should be noted that the effect described here is not necessarily limitative and may be any effect described in the present disclosure.

BRIEF DESCRIPTION OF DRAWINGS

FIG. 4 is a table showing an example of parameters relating to image projection of the projection optical system.

FIG. 5 is a table showing an example of parameters relating to an image modulation device.

FIG. 6 shows lens data of the image display apparatus.

FIG. 7 is a table showing an example of aspheric coefficients of optical components included in the projection optical system.

FIG. 8 is a table showing an example of parameters in the case of using a screen shift function.

FIG. 9 is a table showing an example of parameters in the case of using a scaling function.

FIG. 10 is a table showing an example of parameters relating to the screen shift.

FIG. 11 is a table showing an example of conditions of the parameters relating to the screen shift.

FIG. 23 shows lens data of an image display apparatus.

FIG. 24 is a table showing an example of aspheric coefficients of optical components included in the projection optical system.

FIG. 25 is a table showing an example of parameters in the case of using the screen shift function.

FIG. 26 is a table showing an example of parameters relating to the screen shift.

FIG. 27 is a table showing an example of conditions of the parameters relating to the screen shift.

FIG. 29 shows lens data of an image display apparatus.

FIG. 30 is a table showing an example of aspheric coefficients of optical components included in the projection optical system.

FIG. 31 is a table showing an example of parameters in the case of using the screen shift function.

FIG. 32 is a table showing an example of parameters relating to the screen shift.

FIG. 33 is a table showing an example of conditions of the parameters relating to the screen shift.

FIG. 34 is a table showing an example of parameters relating to the screen shift according to each embodiment.

FIG. 35 is a table showing an example of conditions relating to the screen shift according to each embodiment.

MODE(S) FOR CARRYING OUT THE INVENTION

Hereinafter, embodiments of the present technology will be described with reference to the drawings.

[Outline of Projection Type Image Display Apparatus]

The outline of a projection type image display apparatus will be simply described using a liquid crystal projector as an example. The liquid crystal projector forms an optical image (image light) according to a video signal by spatially modulating light emitted from a light source. For the light modulation, a liquid crystal display device or the like as an image modulation device is used. For example, a three-plate type liquid crystal projector including panel-like liquid crystal display devices (liquid crystal panel) corresponding to RGB is used.

The optical image is enlarged and projected by a projection optical system, and displayed on a screen. Here, description will be made assuming that the projection optical system supports an ultra-wide angle, e.g., a half angle of view being close to 70°. It goes without saying that the half angle of view is not limited thereto.

The liquid crystal projector that supports an ultra-wide angle is capable of displaying a large screen even in a small projection space. That is, even in the case where the distance between the liquid crystal projector and the screen is short, it is possible to perform enlarged projection. Accordingly, the following advantages are achieved.

It is possible to sufficiently suppress the possibility that light from the liquid crystal projector directly enters the human eyes, and achieve high safety, because the liquid crystal projector can be placed close to the screen.

Efficient presentation can be achieved, because shadows of humans or the like do not appear on the screen.

The degree of freedom of choice of installation location is high, and it can be easily installed also in a small installation space or a ceiling with many obstacles.

By installing it on a wall and using it, it is possible to easily perform maintenance such as cable routing as compared with the case where it is installed on a ceiling.

It is possible to increase the degree of freedom of setting for a meeting space, a classroom, a conference room, and the like.

Figure 1:
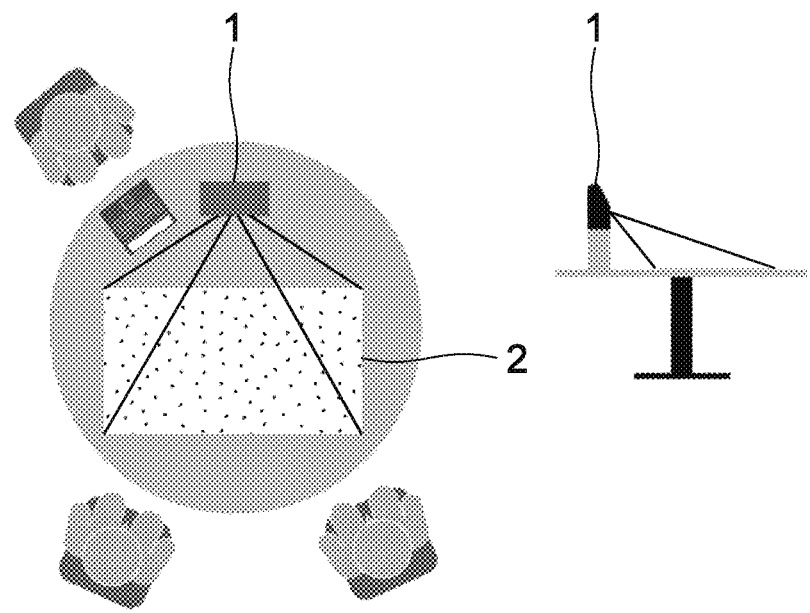
FIG. 1 is a schematic diagram for describing other advantages of a liquid crystal projector that supports an ultra-wide angle.

FIG. 1 is a schematic diagram for describing other advantages of the liquid crystal projector that supports an ultra-wide angle. As shown in FIG. 1, by installing a liquid crystal projector 1 that supports an ultra-wide angle above a table, an enlarged image 2 can be projected on the same table. It can also be used in such a way, and it is possible to efficiently use the space.

Recently, there is a growing demand for the liquid crystal projector that supports an ultra-wide angle with the widespread use of electronic blackboard (Interactive White Board) or the like in school, workplace, and the like. Further, a similar liquid crystal projector is used also in the field of digital signage (electronic advertisement) and the like. Note that as the electronic blackboard, technologies such as LCD (Liquid Crystal Display) and PDP (Plasma Display Panel) can also be used. As compared with these, it is possible to reduce the cost and provide a large screen by using the liquid crystal projector that supports an ultra-wide angle. Note that the liquid crystal projector that supports an ultra-wide angle is also called a short focus projector, an ultra-short focus projector, or the like.

First Embodiment

[Image Display Apparatus]

Figure 2:
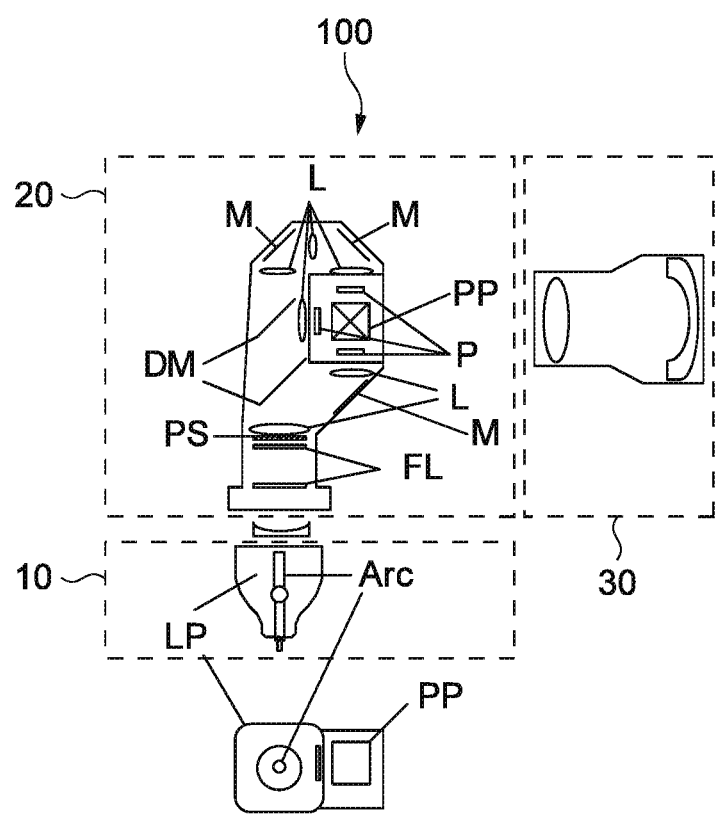
FIG. 2 is a schematic diagram showing a configuration example of a projection type image display apparatus according to a first embodiment.

FIG. 2 is a schematic diagram showing a configuration example of a projection type image display apparatus according to a first embodiment of the present technology. An image display apparatus 100 includes a light source 10, an illumination optical system 20, and a projection optical system 30.

The light source 10 is placed so as to emit a light beam to the illumination optical system 20. As the light source 10, for example, a high pressure mercury lamp or the like is used. Alternatively, a solid light source such as an LED (Light Emitting Diode) and an LD (Laser Diode) may be used.

The illumination optical system 20 causes the light beam emitted from the light source 10 to be uniformly applied to the surface of image modulation devices (liquid crystal panel P) as a primary image surface. In the illumination optical system 20, the light beam from the light source 10 passes through two fly-eye lenses FL, polarization conversion devices PS, and condenser lenses L in the stated order, and is converted into a uniform light beam with uniform polarization.

The light beam that has passed through the condenser lens L is separated into RGB color component light beams by dichroic mirrors DM that each reflect only light of a specific wavelength band. The RGB color component light beams enter the liquid crystal panel P (image modulation devices) provided corresponding to RGB colors via total reflection mirrors M, lenses L, and the like. Then, by the liquid crystal panel P, light modulation according to a video signal is performed. The light-modulated color component light beams are combined by a dichroic prism PP to generate image light. Then, the generated image light is emitted toward the projection optical system 30.

The optical components and the like constituting the illumination optical system 20 are not limited, and optical components different from the above-mentioned optical components may be used. For example, as the image modulation device, a reflective liquid crystal panel, a digital micromirror device (DMD), or the like may be used instead of the transmissive liquid crystal panel P. Further, for example, instead of the dichroic prism PP, a polarization beam splitter (PBS), a color combining prism that combines video signals of RGB colors, a TIR (Total Internal Reflection) prism, or the like may be used. In this embodiment, the illumination optical system 20 corresponds to the image generation unit.

The projection optical system 30 adjusts the image light emitted from the illumination optical system 20, and enlarges and projects it on a screen as a secondary image surface. That is, by the projection optical system 30, image information on the primary image surface (liquid crystal panel P) is adjusted and enlarged and projected on the secondary image surface (screen).

Figure 3:
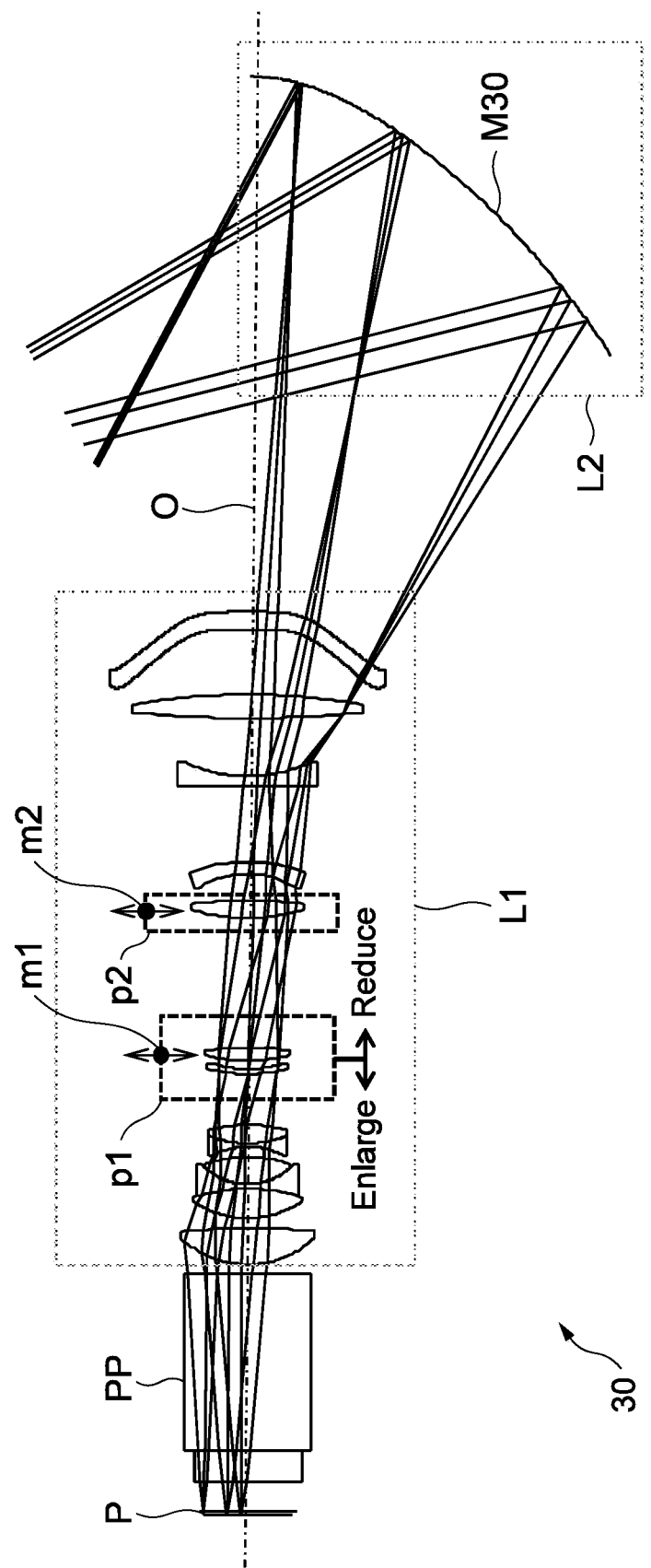
FIG. 3 is an optical path diagram showing a schematic configuration example of the projection optical system according to the first embodiment.

FIG. 3 is an optical path diagram showing a schematic configuration example of the projection optical system according to the first embodiment. Here, the optical path at reference projection is shown. Note that in FIG. 3, the liquid crystal panel P and the dichroic prism PP of the illumination optical system 20 are schematically shown.

The projection optical system 30 includes a first optical system L1 and a second optical system L2. The first optical system L1 has a positive refractive power as a whole. In the following, the entire refractive power of the first optical system L1 in the case where all optical components included in the first optical system L1 are at reference positions, i.e., at reference projection is described as $\varphi 1$. Further, all the optical components included in the first optical system L1 are configured to have rotationally symmetric surfaces with respect to a common optical axis O.

The first optical system L1 includes a first lens group p1, a second lens group p2, and other lens groups. Further, the first optical system L1 includes a first movement mechanism m1 and a second movement mechanism m2. In FIG. 3, each movement mechanism is schematically shown by an arrow. Note that in this embodiment, the lens group includes one or more lenses.

The first lens group p1 is a lens group having a first refractive power $\varphi p1$. The first lens group p1 is moved along a direction substantially perpendicular to the optical axis O by the first movement mechanism m1. Further, the first lens group p1 is moved along a direction substantially in parallel with the optical axis by the first movement mechanism m1.

The second lens group p2 is a lens group having a second refractive power $\varphi p2$. The second lens group p2 is moved along a direction substantially perpendicular to the optical axis O by the second movement mechanism m2. Note that the lens group used as the first and second lens groups p1 and p2 is not limited.

Specific configurations of the first and second movement mechanisms m1 and m2 are not limited. For example, the movement mechanisms may each include an actuator such as a motor, a guide rail, or the like. Alternatively, other well-known technologies may be used. For example, as each movement mechanism, a vibration isolation technology of an optical system used in an imaging apparatus or the like may be used.

The first and second movement mechanisms m1 and m2 respectively move the first and second lens groups p1 and p2 in conjunction with each other. For this purpose, typically, the image display apparatus 100 includes a controller (control unit) that integrally controls the actuator constituting each movement mechanism, and the like. Accordingly, it is possible to move each lens group electrically in conjunction with each other. In addition, each lens group may be mechanistically coordinated by a mechanical configuration that coordinates the first and second movement mechanisms m1 and m2 with each other.

The second optical system L2 includes a concave reflecting surface M30 that reflects the image light emitted from the first optical system L1. The concave reflecting surface M30 has a rotationally symmetric aspheric surface and is placed on the optical axis O common to the first optical system. The image light reflected by the concave reflecting surface M30 is projected on a screen. Accordingly, it is possible to project the image light at an ultra-wide angle. Accordingly, for example, even in the case where the distance between the projector and the screen is short, it is possible to display a large screen.

By moving the optical components included in the first optical system L1 in a direction substantially perpendicular to the optical axis O, i.e., decentering the optical components with respect to the optical axis O, it is possible to change the travelling direction of the image light. Therefore, it is possible to move the imaging position on the screen of the image light emitted from the projection optical system 30. Accordingly, it is possible to achieve a screen shift function for shifting the entire image projected on the screen.

In this embodiment, the first movement mechanism m1 moves the first lens group p1, thereby achieving a screen shift function 1. Further, the second movement mechanism m2 moves the second lens group p2, thereby achieving a screen shift function 2.

In the screen shift function 1, the first lens group p1 is moved in a first orientation along a direction substantially perpendicular to the optical axis O. The first orientation is set depending on, for example, the orientation that a user desires to move the screen. Further, the movement amount of the first lens group is set within a predetermined movement range depending on, for example, the amount that the user desired to move the screen.

In the screen shift function 2, the second lens group p2 is moved in a second orientation along a direction substantially perpendicular to the optical axis O. The second orientation is set depending on the first refractive power $\varphi p1$ of the first lens group p1, the second refractive power $\varphi p2$ of the second lens group p2, and the first orientation in the screen shift function 1.

For example, the second orientation is opposite to the first orientation, in the case where the first and second refractive powers $\varphi p1$ and $\varphi p2$ have the same sign. Meanwhile, the second orientation is the same orientation as the first orientation, in the case where the first and second refractive powers $\varphi p1$ and $\varphi p2$ have different signs. In this embodiment, description will be made assuming that the first and second refractive powers $\varphi p1$ and $\varphi p2$ are positive.

Further, in the screen shift function 2, the second lens group p2 is moved by the movement amount corresponding to the movement amount of the first lens group p1 in the screen shift function 1.

As described above, in this embodiment, the entire image projected on the screen can be moved (shifted) by the screen shift functions 1 and 2. That is, by decentering the first and second lens groups p1 and p2 with respect to the optical axis O, it is possible to change the travelling direction of the image light in two stages.

Note that in the case of decentering the optical components, the incident position, incident angle, and the like of light that enters the optical components is changed, which may cause decentration aberration to occur. Due to the decentration aberration, for example, the imaging position depending on the wavelength of light, the incident position, the incident angle, and the like is displaced. Therefore, for example, the imaging performance on the screen of the projection optical system 30 may be deteriorated and it may be difficult to properly display an image.

In this regard, in this embodiment, each lens group is appropriately moved so as to correct the decentration aberration due to the decentration of the first and second lens groups p1 and p2.

The present inventors fond the following conditional expressions (1) to (4) regarding the configuration of the projection optical system 30 including the movement amount of each lens group.

That is, the projection optical system 30 is configured so that the first refractive power φp1, the second refractive power φp2, a refractive power φ1 of the first optical system at reference projection, a movement amount Mp1 of the first lens group, and a movement amount Mp2 of the second lens group satisfy the following relationships of:

$$0.1 < |\varphi p1/\varphi p2| < 5.0; \tag{1}$$

$$0.1 < |Mp1/Mp2| < 20; \tag{2}$$

$$0.1 < |\varphi p1/\varphi 1| < 5.0; \text{ and} \tag{3}$$

$$0.1 < |\varphi p2/\varphi 1| < 5.0 \tag{4}.$$

It has been found that in the case where these conditions are satisfied, correction of decentration aberration due to the screen shift is sufficiently achieved.

Note that the above-mentioned conditional expression (1) appropriate determines the first and second refractive power φp1 and φp2 achieving the screen shift functions 1 and 2. In the case where the lower limit defined in the conditional expression (1) is not satisfied, correction of decentration aberration by the screen shift function 2 is excessive, which results in deterioration of the imaging performance. Further, in the case where the upper limit defined in the conditional expression (1) is exceeded, correction by the screen shift function 2 cannot be sufficiently performed, which results in deterioration of the imaging performance.

The above-mentioned conditional expression (2) appropriately determines the movement amounts Mp1 and Mp2 of the first and second lens group p1 and p2 achieving the screen shift functions 1 and 2 in a direction substantially perpendicular to the optical axis O. In the case where the lower limit defined in the conditional expression (2) is not satisfied, correction of decentration aberration by the screen shift function 2 is excessive, which results in deterioration of the imaging performance. Further, in the case where the upper limit defined in the conditional expression (2) is exceeded, correction by the screen shift function 2 cannot be sufficiently performed, which results in deterioration of the imaging performance.

The above-mentioned conditional expressions (3) and (4) appropriate determine the first and second refractive powers φp1 and φp2 and the refractive power φ1 of the first optical system L1. For example, in the case where the refractive power of each lens group does not reach the lower limit defined in the conditional expressions (3) and (4), the screen shift amount is reduced while decentration aberration occurs less. Further, in the case where the upper limit defined in the conditional expressions (3) and (4), decentration aberration occurs more, which results in deterioration of optical performance including the imaging performance.

Note that the condition for achieving the correction of decentration aberration due to the screen shift is not limited to those described above. For example, the condition of moving the first lens group p1 by the largest amount along a direction substantially perpendicular to the optical axis O and moving the second lens group p2 by the second largest amount along a direction substantially perpendicular to the optical axis O may be added (in this case, the upper limit of the conditional expression (2) is 1). Also in this case, decentration aberration due to the screen shift can be sufficiently corrected.

Further, for example, the range of each of the conditional expressions (1) to (4) may be narrowed. That is, the lower limit and the upper limit in the conditional expressions (1) to (4) may be changed to arbitrary values within the range of the respective conditional expressions to exhibit desired characteristics. Also such a conditional expression is a new parameter according to the present technology.

Note that by moving at least one lens group included in the first optical system L1 along a direction substantially in parallel with the optical axis O, it is possible to change the display size of the image to be projected on the screen. Therefore, it is possible to achieve the scaling function for enlarging and reducing the image to be projected.

As shown in FIG. 3, in this embodiment, the first lens group p1 is moved along a direction substantially in parallel with the optical axis O by the first movement mechanism m1. Since the first refractive power φp1 of the first lens group p1 is positive, the image can be enlarged and reduced by moving the first lens group p1 toward the primary and secondary image surfaces, respectively (see "enlarge" and "reduce" in FIG. 3).

In this embodiment, the image shift functions 1 and 2 are executed in conjunction with the scaling function. That is, the movement of the first and second lens groups p1 and p2 along a direction substantially perpendicular to the optical axis O is performed in conjunction with the movement of the first lens group p1 along a direction substantially in parallel with the optical axis O.

Accordingly, for example, it is possible to appropriately correct, with the screen shift functions 1 and 2, the displacement of the projection position, which is caused by the scaling function. Therefore, it is possible to enlarge and reduce the image without displacing the projection position.

Note that the lens group to be moved to achieve the scaling function is not limited. For example, instead of the first lens group p1, another lens group included in the first optical system L1 may be moved substantially in parallel with the optical axis. Further, a plurality of lens groups may be moved to achieve the scaling function.

In addition to the scaling function, other functions may be achieved. For example, in the case where the distance for projecting an image is switched from a short distance to a long distance, focusing is performed to adjust the focal point depending on the projection distance. At this time, a floating function for correcting the optical performance such as the imaging performance and image distortion is used. For example, by moving the first lens group p1 along a direction substantially in parallel with the optical axis O, both the floating function and the scaling function may be achieved.

Now, the projection optical system 30 configured as described above will be simply described with specific numerical value examples.

FIG. 4 is a table showing an example of parameters relating to image projection of the projection optical system. A numerical aperture NA of the projection optical system 30 on the primary image surface side is 0.163. Further, the maximum half angle of view ω at the reference projection distance is 76°, and the maximum primary image surface height y is 13.6 mm.

FIG. 5 is a table showing an example of parameters relating to an image modulation device. In the example shown here, the image modulation devices (liquid crystal panel P) have a rectangular shape with lengths of 16.6 mm in the lateral direction and 8.7 mm in the longitudinal direction. Further, the image modulation devices have a screen center position at a position displaced by 6.4 mm from the optical axis O in the perpendicular direction.

FIG. 6 shows lens data of the image display apparatus. In FIG. 6, data regarding optical components (lenses) s1 to s28 arranged from the primary image surface side to the secondary image surface side is shown. As the data of each of the optical components, a curvature radius r (mm), component space and core thickness d (mm), a refractive index nd at a d line (587.56 nm), and an Abbe number vd at the d line are described.

Further, the lens groups grouped with "{" marks are lens groups relating to the screen shift functions 1 and 2 (expressed as SF in the figure) and the scaling function (expressed as MF in the figure). That is, s14 to s17 are used as the first lens group p1, and s18 and s19 are used as the second lens group p2. In the data, d1 and d2 represent lens spaces that vary in the case of achieving the scaling function and the floating function. Note that "*" marks each indicate that it is an optical component having an aspherical surface. The optical component having an aspherical surface follows the following expression.

$$Z = \frac{ch^2}{1+\{1-(1+K)c^2h^2\}1/2} + \sum_{i=1} A_i h^i \qquad [\text{Math. 1}]$$

FIG. 7 is a table showing an example of aspheric coefficients of optical components included in the projection optical system. In FIG. 7, aspheric coefficients of the optical components s20, s21, s26, s27, and s28 having aspherical surfaces to which "*" marks are added in FIG. 6 are show. The aspheric coefficients shown in the example of the figure correspond to the above-mentioned expression (Math. 1).

FIG. 8 is a table showing an example of parameters in the case of using the screen shift function. In FIG. 8, an example of the movement amount (decentering amount) and movement direction (positive and negative represent the orientation) of the first and second lens groups p1 and p2 in the case where the screen to be projected on the screen or the like is shifted in the directions of the lower side, upper side, left side, lower left side, and upper left side is shown. Here, the right and left direction and the up and down direction of the screen respectively correspond to the x axis and the y axis. For example, in the case of shifting the screen upward, the first lens group p1 is moved by −1.81 mm in the y axis direction, and the second lens group p2 is moved by 0.74 mm in the y axis direction.

FIG. 9 is a table showing an example of parameters in the case of using the scaling function. In FIG. 9, spaces (d1 and d2) before and after the first lens group p1 on the enlarging side, the middle position, and the reducing side are shown. Further, in FIG. 9, the amount of decentration to the y axis direction of the first and second lens groups p1 and p2 depending on the scaling position is shown. For example, in the case where each lens group is on the enlarging side, d1 is 14.4 mm and d2 is 41.2 mm. At this time, the first lens group p1 is moved in the y axis direction by 0.3 mm, and the second lens group p2 is moved in the y axis direction by −0.1 mm.

FIG. 10 is a table showing an example of parameters relating to the screen shift. The refractive power φ1 of the first optical system L1 is 0.032, and the first and second refractive powers φp1 and φp2 are 0.010 and 0.014, respectively. Further, the movement amount Mp1 of the first lens group p1 is −1.81 mm in the y direction, and the movement amount Mp2 of the second lens group p2 is 0.74 mm in the y direction. Although the movement amount in the y direction is shown as the movement amount of each lens group in FIG. 10, the lens group may be moved in any direction as long as the direction is perpendicular to the optical axis O. Note that values shown in FIG. 10 correspond to the case where the screen shift is performed upward in FIG. 8.

FIG. 11 is a table showing an example of conditions of the parameters relating to the screen shift. φp1/φp2 relating to the above-mentioned conditional expression (1) is 0.76. Mp1/Mp2 relating to the above-mentioned conditional expression (2) is −2.43. Further, φp1/φ1 and φp2/φ1 relating to the above-mentioned conditional expressions (3) and (4) are 0.33 and 0.43, respectively. As described above, the values shown in FIG. 11 satisfy the conditional expressions (1) to (4).

Figure 12:
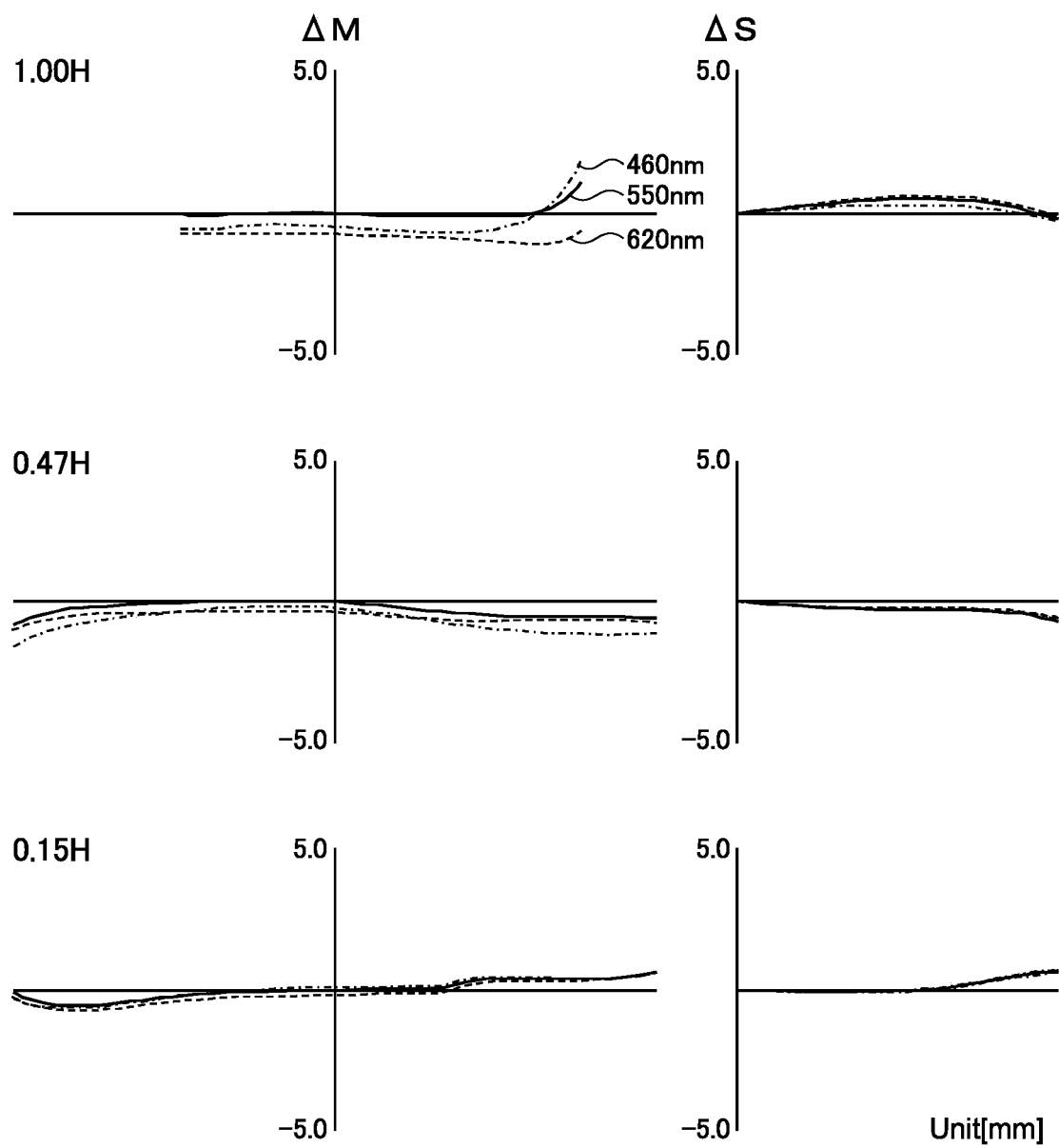
FIG. 12 is a graph showing an example of a transverse aberration diagram at reference projection by the projection optical system.

FIG. 12 is a graph showing an example of a transverse aberration diagram at reference projection by the projection optical system. In FIG. 12, the lateral aberration in the case where the decentration amount of the first and second lens groups p1 and p2 is zero is shown. The displacement (longitudinal axis) on the image surface has one division of 5 mm. The graphs drawn by a solid line, a dotted line, and a dot-dash line respectively correspond the wavelengths of 550 nm, 620 nm, and 460 nm. Further, the aberration on the meriodinal image plane (left side) and the sagittal image surface (right side) are shown for each condition of the image heights of 1.0 H, 0.47 H, and 0.15 H (H represents the maximum image height).

Figure 13:
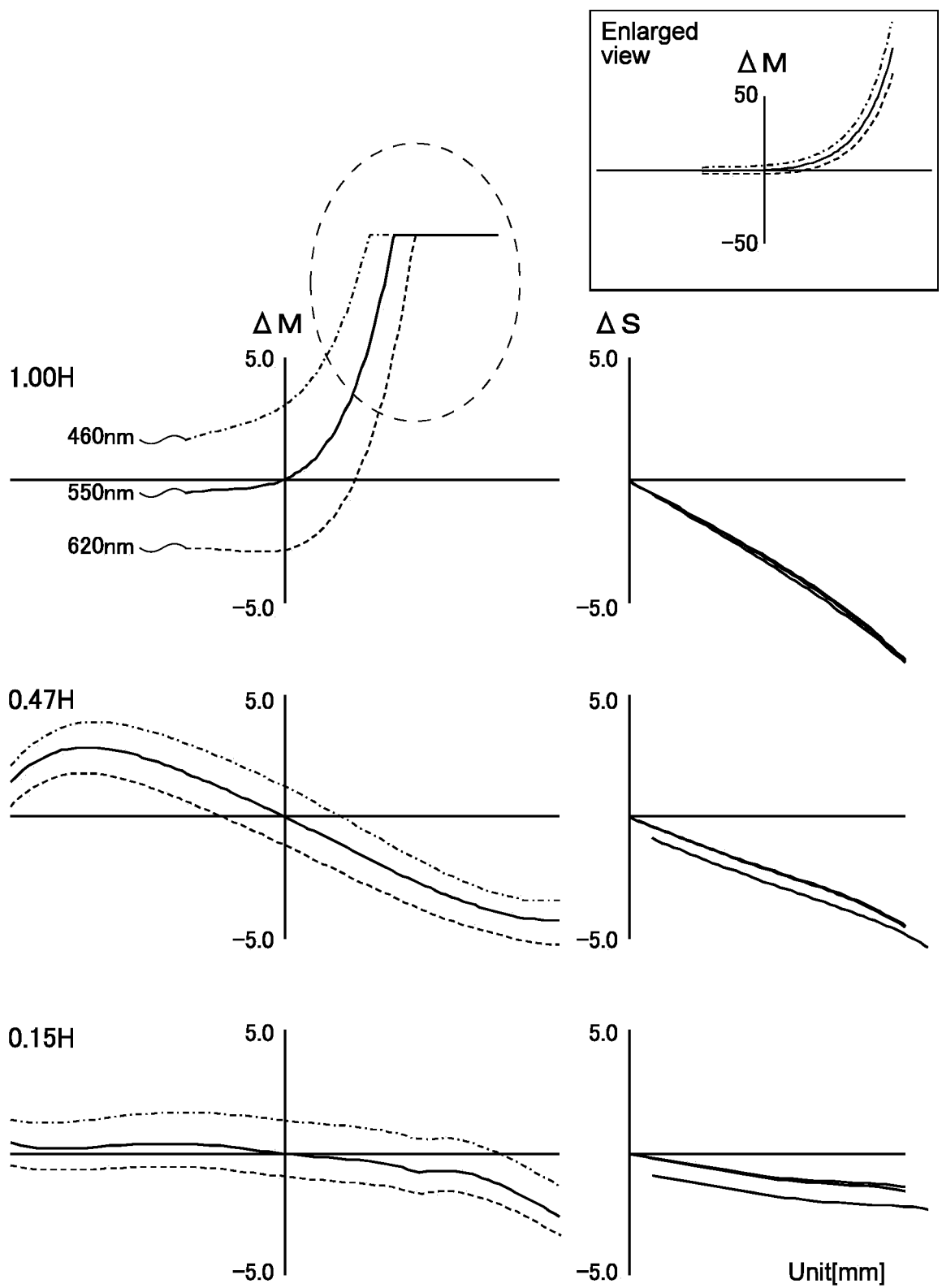
FIG. 13 is a graph showing an example of the transverse aberration diagram in the case where a first lens group is decentered.

FIG. 13 is a graph showing an example of the transverse aberration diagram in the case where the first lens group is decentered. In FIG. 13, the lateral aberration in the case where the first lens group p1 is decentered in the y axis direction by −1.81 mm is shown. As compared with the lateral aberration at reference projection (see FIG. 12), each graph tends to largely depart from the lateral axis, and displacement on the image surface is remarkable. In particular, as shown in the graph of an enlarged view, the imaging performance is largely deteriorated regarding the light beam at the most peripheral edge, and displacement of not less than 50 mm occurs. Further, it can be seen that the direction or magnitude of displacement differs for each wavelength and the wavelength dependence of the aberration greatly appears.

Figure 14:
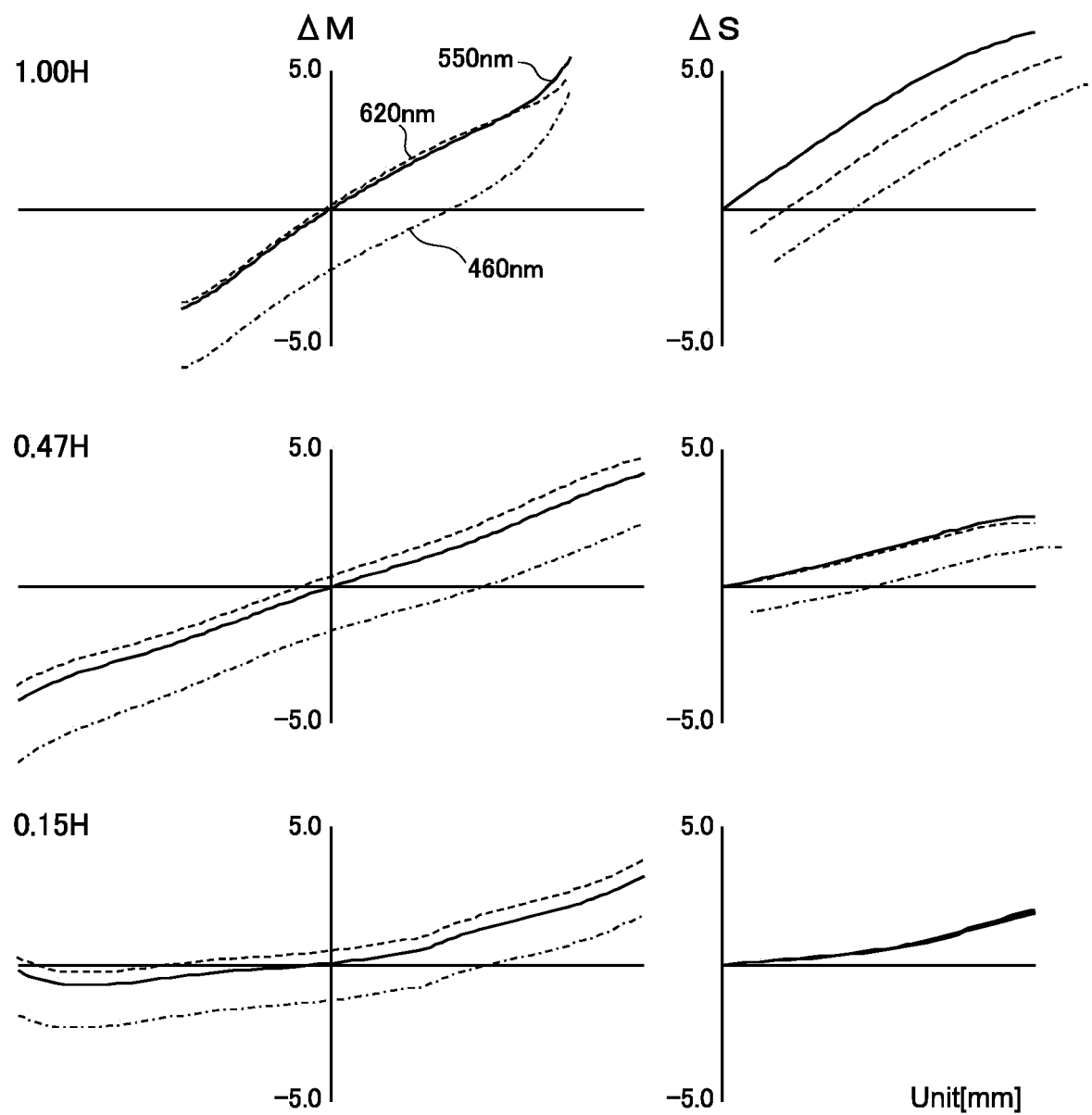
FIG. 14 is a graph showing an example of the transverse aberration diagram in the case where a second lens group is decentered.

FIG. 14 is a graph showing an example of the transverse aberration diagram in the case where the second lens group is decentered. In FIG. 14, the lateral aberration in the case where the second lens group p2 is decentered in the y axis direction by 0.74 mm is shown. It can be seen from each graph that the decentration aberration greatly appears.

Figure 15:
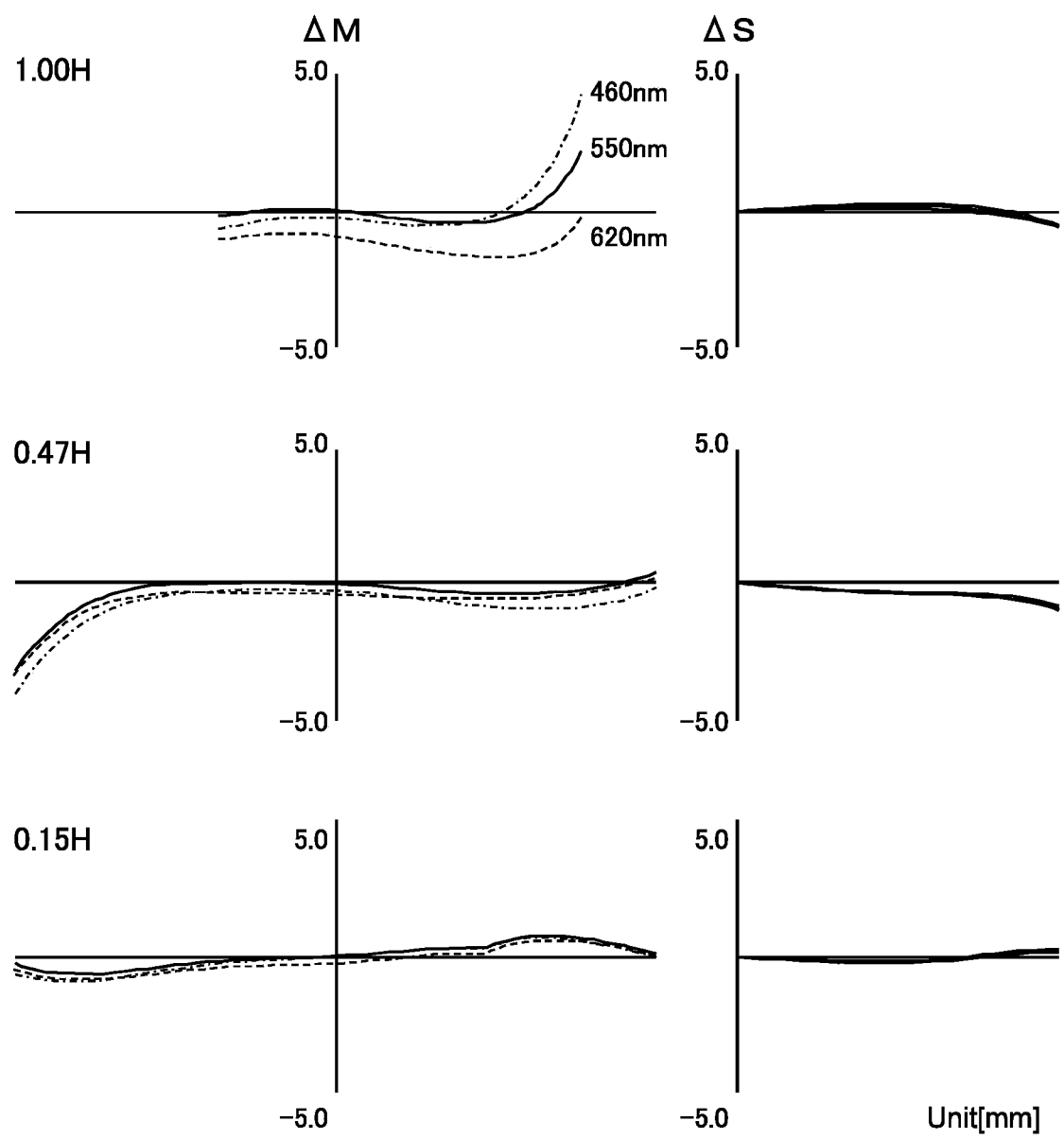
FIG. 15 is a graph showing an example of the transverse aberration diagram in the case where the first and second lens groups are decentered.

FIG. 15 is a graph showing an example of the transverse aberration diagram in the case where the first and second lens groups are decentered. In FIG. 15, the lateral aberration in the case where the first lens group p1 is decentered in the y axis direction by −1.81 mm and the second lens group p2 is decentered in the y axis direction by 0.74 mm is shown. As compared with the case where only one of the first and second lens groups is decentered (see FIG. 13 and FIG. 14), displacement on each image surface due to the aberration is small. Further, it can be seen that each graph shown in FIG. 15 has a shape similar to each graph of the lateral aberration at reference projection (see FIG. 12). That is, in FIG. 15, the imaging performance approaches the designed value at reference projection shown in FIG. 12, and decentration aberration has been corrected.

Figure 16:
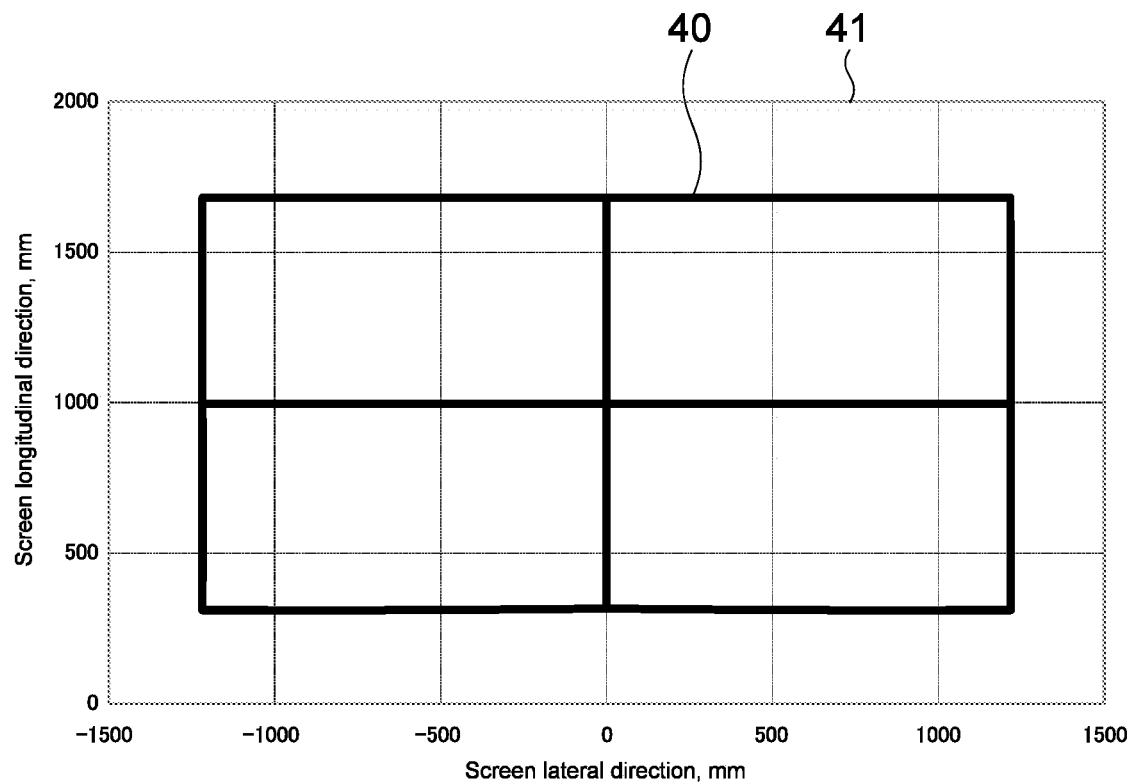
FIG. 16 is a schematic diagram showing an example of a projection image at reference projection by the projection optical system.

FIG. 16 is a schematic diagram showing an example of a projection image at reference projection by the projection optical system. In FIG. 16, a projection image 40 is indicated by a bold line, and coordinates (0, 1000) on a screen 41 are the center of the projection image 41. The lateral axis and the longitudinal axis of the screen 41 correspond to the above-mentioned x axis and y axis, respectively.

Figure 17:
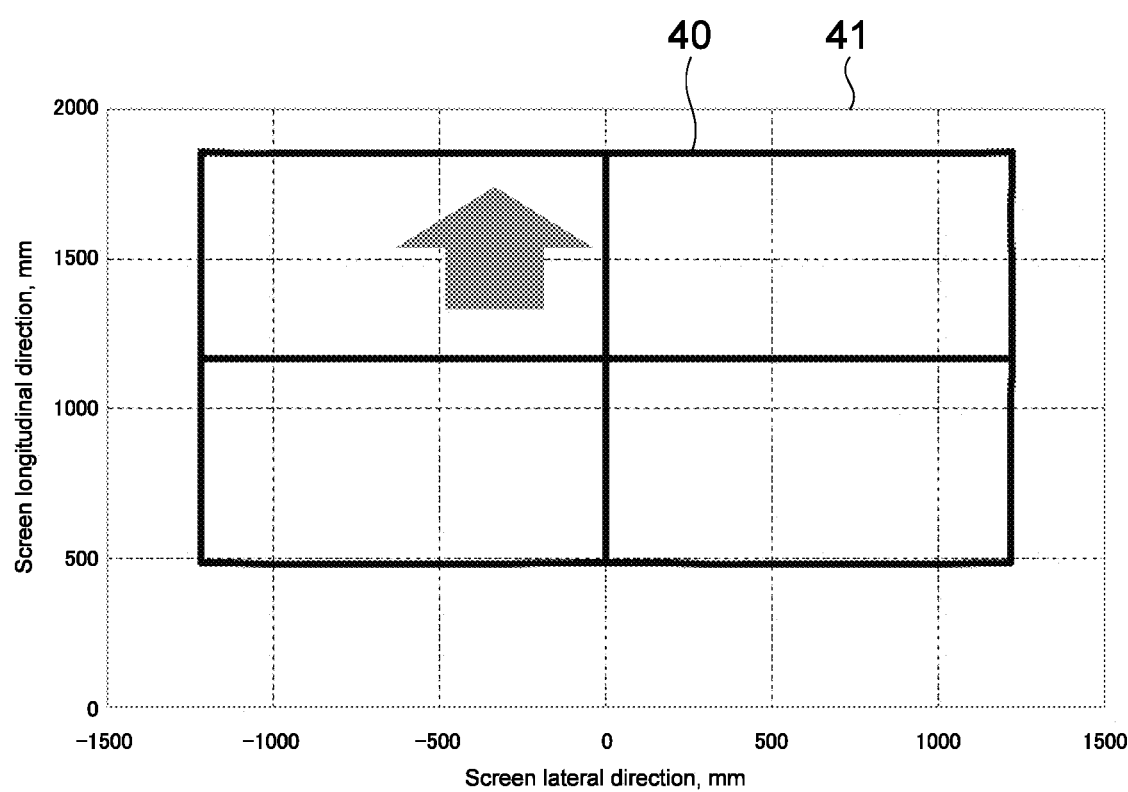
FIG. 17 is a schematic diagram showing an example of the image shift in the case where the first lens group is decentered.

FIG. 17 is a schematic diagram showing an example of the image shift in the case where the first lens group is decentered. In FIG. 17, the projection image 40 in the case where the first lens group p1 is decentered in the y axis direction by −1.81 mm (similarly to FIG. 13) is schematically shown. Due to the decentration of the first lens group p1, the projection image 40 is shifted upward as compared with that at reference projection.

Figure 18:
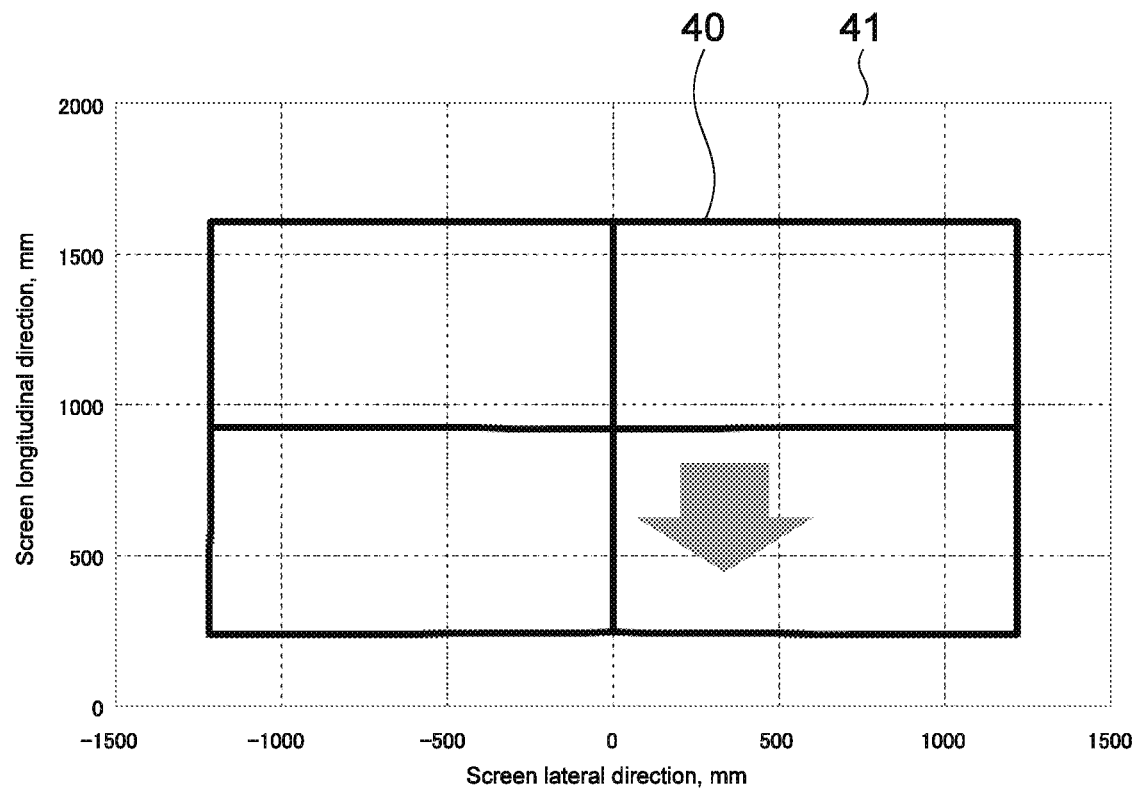
FIG. 18 is a schematic diagram showing an example of the image shift in the case where the second lens group is decentered.

FIG. 18 is a schematic diagram showing an example of the image shift in the case where the second lens group is decentered. In FIG. 18, the projection image 40 in the case where the second lens group p2 is decentered in the y axis direction by 0.74 mm (similarly to FIG. 14) is schematically shown. Due to the decentration of the second lens group p2, the projection image 40 is shifted downward as compared with that at reference projection. Further, as compared with the case where the first lens group p1 is decentered (see FIG. 17), the shift amount of the projection image 40 is small.

Figure 19:
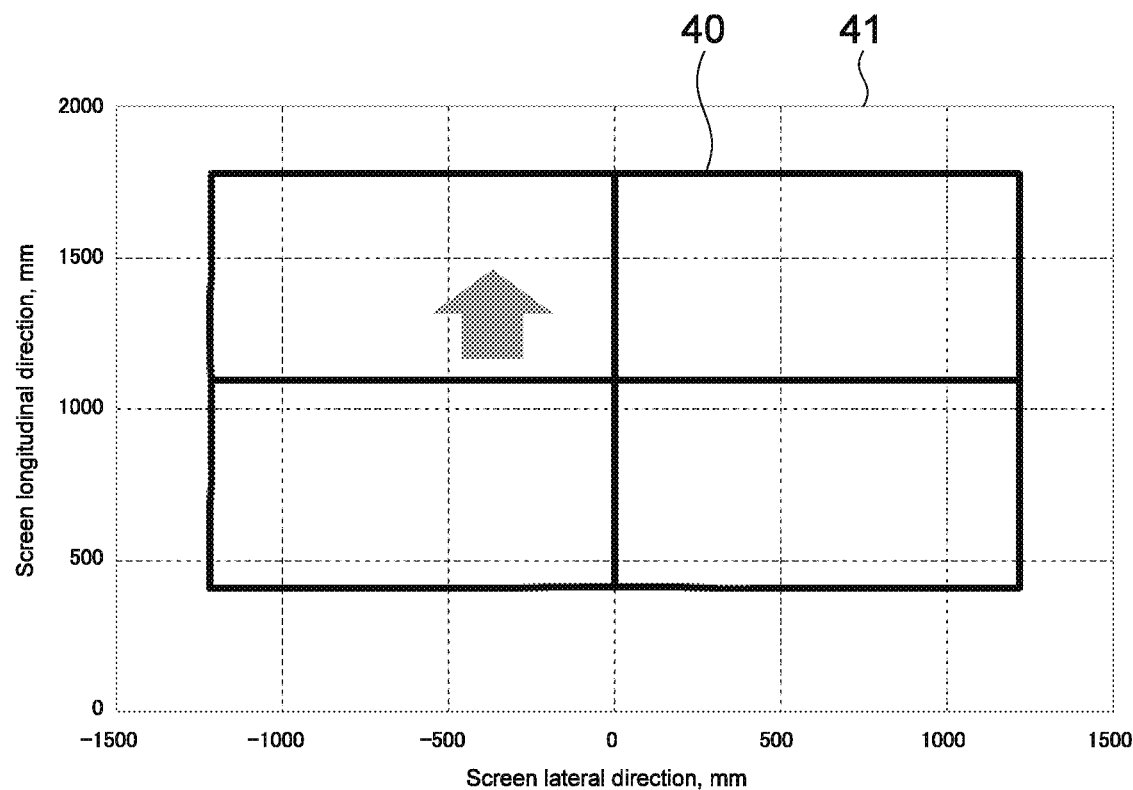
FIG. 19 is a schematic diagram showing an example of the image shift in the case where the first and second lens groups are decentered.

FIG. 19 is a schematic diagram showing an example of the image shift in the case where the first and second lens groups are decentered. In FIG. 19, the projection image 40 in the case where the first lens group p1 is decentered in the y axis direction by −1.81 mm and the second lens group p2 is decentered in the y axis direction by 0.74 mm (similarly to FIG. 15) is schematically shown. Due to the decentration of each lens group, the projection image 40 is shifted upward as compared with that at reference projection. That is, by decentering the first and second lens groups p1 and p2, the image to be projected finally is shifted.

As described above, in the image display apparatus 100 according to this embodiment, by decentering the first and second lens groups p1 and p2, the travelling direction and the like of the image light generated by the illumination optical system 20 are adjusted, and the image position on the screen is moved. At this time, the second lens group p1 is moved depending on the refractive power of each lens group and the decentration amount of the first lens group p1 to correct the image on the screen. Accordingly, it is possible to adjust the image position without deteriorating the image.

In the projection type image display apparatus described in this embodiment, the screen or the like on which the image is displayed and the image display apparatus are separately arranged. Therefore, in the case where the position or the like at which the image display apparatus is placed is displace, the image on the screen is also displaced.

Figure 20:
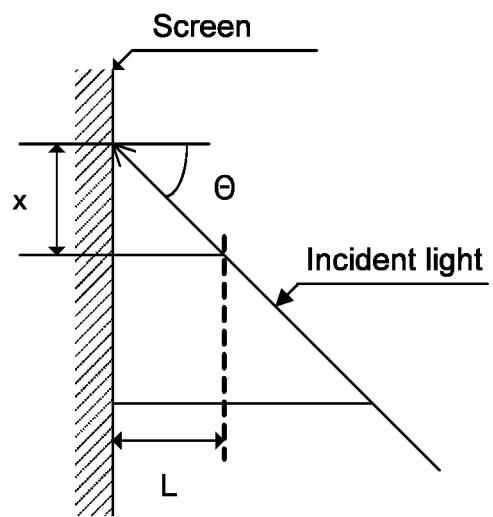
FIG. 20 is a schematic diagram for describing an example of displacement of the image on a screen.

FIG. 20 is a schematic diagram for describing an example of displacement of the image on the screen. Light (incident light) enters the screen at an incident angle θ. In the case where the position of the screen is changed in a direction perpendicular to the screen surface by a distance L, the entering position of light on the screen is changed by a displacement amount x. At this time, the displacement amount x is proportional to tan θ.

For example, in the case where light is incident using the liquid crystal projector or the like that supports an ultra-wide angle, the incident angle θ is close to 70°. In the apparatus that supports an ultra-wide angle, the value of the displacement amount x due to the change in the distance L is approximately 7.5 times)(=tan 70°/tan 20° that in the apparatus that does not support an ultra-wide angle (incident angle is close to 20°). Therefore, in the case where the apparatus supports an ultra-wide angle, in the case where the distance between the liquid crystal projector or the like and the screen is changed, the image on the screen is largely moved. For such a change in the image position or the like, a technology for shifting the image on the screen has been proposed.

Figure 21:
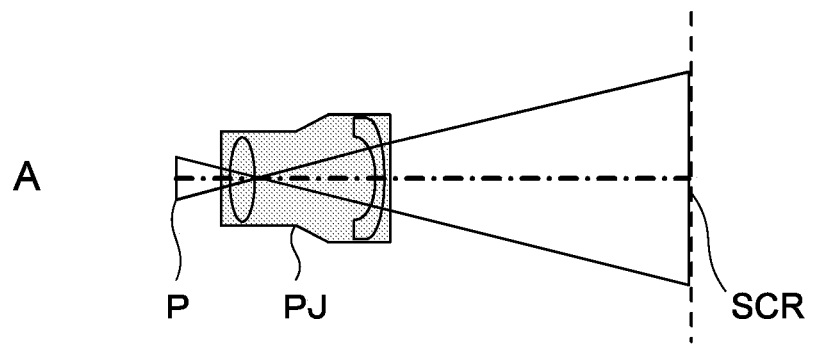
FIG. 21 is a schematic diagram for describing an example of a technology for shifting the image on the screen.
Figure 21:
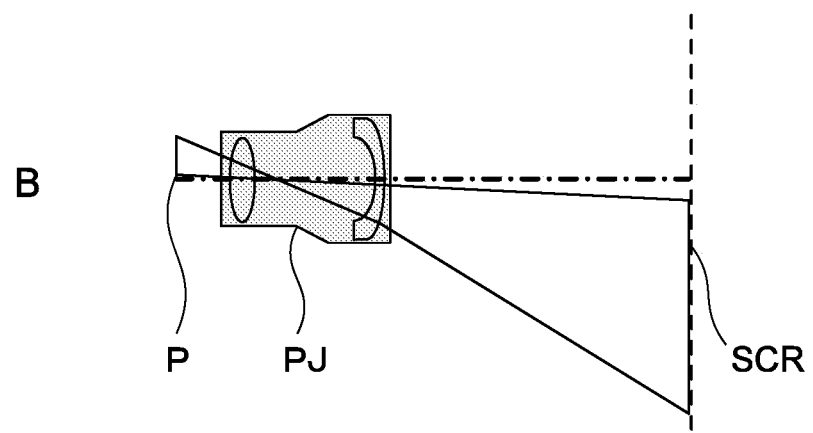

FIG. 21 is a schematic diagram for describing an example of a technology for shifting the image on the screen. In FIG. 21, a primary image surface P, a projection optical system PJ, and a screen SCR are shown. For example, Part A of FIG. 21, the optical axis of the projection optical system PJ is located to pass through the center of the primary image surface P. In the case where the entire projection optical system PJ is moved in parallel with the primary image surface P (Part B of FIG. 21), the image position on the screen is shifted. In addition, a technology for shifting the image position by moving a part of the optical components included in the projection optical system perpendicular to the optical axis has been proposed.

In the case of moving the entire projection optical system, for example, a large movement mechanism capable of withstanding the weight of the entire projection optical system including the housing and the like is necessary. This leads to an increase in size and complication of the apparatus, which may lead to a significant increase in cost.

Further, in the case of moving a part of the optical components included in the projection optical system, decentration aberration occurs due to the decentration of the optical components. Therefore, for example, aberration such as field curvature and distortion in which the image is projected with an inclination relative to the screen occurs. Further, in the case of largely shifting the image, or in the case where the depth or the like becomes shallow in order to project a high brightness•high resolution image, the influence of the decentration aberration becomes large and deterioration of the image cannot be avoided.

In the image display apparatus 100 according to this embodiment, by decentering, from the optical axis O, the first and second lens groups p1 and p2 in the lens group included in the first optical system L1, the image shift is performed. That is, by moving a part of the optical components included in the projection optical system 30, the screen shift function is achieved. Accordingly, it is possible to use a lightweight and compact movement mechanism as the first and second movement mechanisms m1 and m2 for moving each lens group. Accordingly, it is possible to avoid the increase in size and complication of the apparatus leading to an increase in cost when achieving the screen shift. Therefore, it is possible to achieve the screen shift function with a low-cost and compact configuration.

Further, in this embodiment, by coordinating the first and second movement mechanisms m1 and m2, the second lens group p2 is decentered so as to correct decentration aberration or the like due to the decentration of the first lens group p1. That is, two lens groups are used for performing the screen shift and correction of the decentration aberration or the like in conjunction with each other. Accordingly, it is possible to suppress the influence of decentration aberration or the like due to the decentration of the optical components, and deterioration of the imaging performance including deformation or the like of the image shape. Accordingly, even in the case of supporting an ultra-wide angle, it is possible to easily and reliably adjust the image position without deteriorating the image.

Further, for example, even in the case of shifting the distance such that the influence of aberration or the like occurs with a single lens group, it is possible to deal with it by using two lens groups. That is, it is possible to properly perform the screen shift over a wide range. Therefore, for example, even in the case of simply placing the apparatus, it is possible to sufficiently correct the image position and display an image at an appropriate position. Accordingly, it is possible to handle the apparatus simply and reduce the burden on the user.

Further, since decentration aberration can be corrected to display each pixel at an appropriate projection position, it is possible to adjust the image position without deteriorating the image quality even in the case of displaying high brightness•high resolution content or the like. Accordingly, it is possible to provide a high quality video experience.

In this embodiment, the first lens group p1 and the first movement mechanism m1 are used for achieving the scaling function and the floating function. Accordingly, it is possible to exert, for example, a function of changing the mode of the projection distance in addition to the function of enlarging•reducing the image. Further, since the screen shift function and a common lens group and the like are used, it is possible to expand a plurality of functions at low cost with a compact configuration.

Further, the first and second lens groups p1 and p2 are decentered in conjunction with each other according to the scaling function. Accordingly, for example, it is possible to, for example, enlarge the image while maintaining the image position. Therefore, even in the case of supporting an ultra-wide angle, it is possible to appropriately adjust the image size and the like corresponding to the size of the screen or the like.

Second Embodiment

The projection type image display apparatus according to a second embodiment of the present technology will be described. In the following description, description of parts similar to the configuration and effects in the image display apparatus 100 described in the above-mentioned embodiment will be omitted or simplified.

In the first embodiment, the first and second lens groups included in the projection optical system have had refractive powers of the same sign. Even in the case where the first and second lens groups have refractive powers of different signs, the present technology is applicable.

Figure 22:
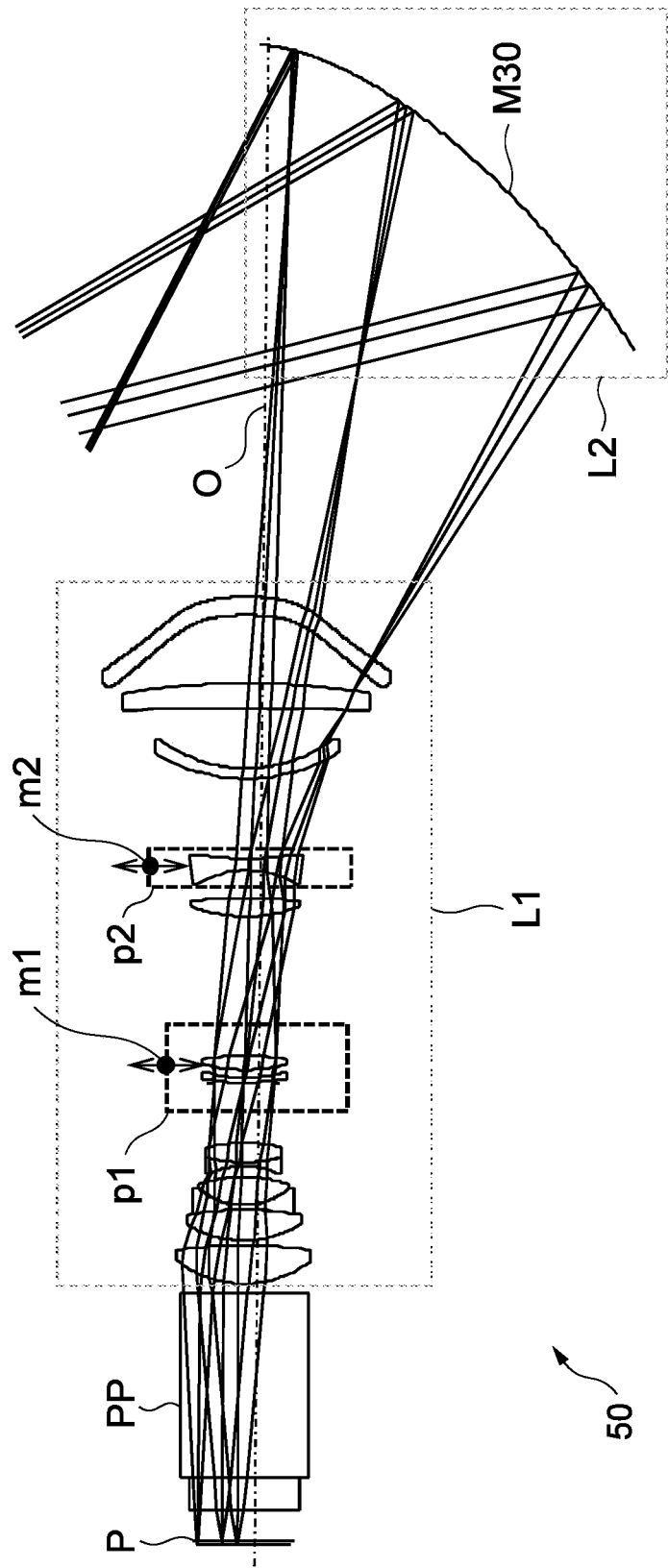
FIG. 22 is an optical path diagram showing a schematic configuration example of a projection optical system according to a second embodiment.

FIG. 22 is an optical path diagram showing a schematic configuration example of a projection optical system according to the second embodiment. In a projection optical system 50 shown in FIG. 22, the configuration of the first and second lens groups p1 and p2 is different from that in the above-mentioned embodiment.

In this embodiment, the first lens group p1 has the first refractive power φp1 that is a positive refractive power. Further, the second lens group p2 has the second refractive power φp2 that is a negative refractive power. That is, the first and second refractive powers φp1 and φp2 have different signs.

Each lens group is moved along a direction substantially perpendicular to the optical axis O by the first and second movement mechanisms m1 and m2. The mechanism or the like for moving each lens group is not limited. Further, a movement mechanism or the like that moves a predetermined lens group in parallel with the optical axis O may be provided to achieve the scaling function and the like.

Now, the projection optical system 50 configured as described above will be simply described with specific numerical value examples.

The parameters relating to image projection of the projection optical system 50 are similar to those in the above-mentioned embodiment (see FIG. 4). That is, the numerical aperture NA on the primary image surface side is 0.163, the maximum half angle of view ω at the reference projection distance is 76°, and the maximum primary image surface height y is 13.6 mm.

Further, also the parameters relating the liquid crystal panel P (image modulation devices) shown in FIG. 22 are similar to those in the above-mentioned embodiment (see FIG. 5). That is, the liquid crystal panel P has a rectangular shape with lengths of 16.6 mm in the lateral direction and 8.7 mm in the longitudinal direction, and has a screen center position at a position displaced by 6.4 mm from the optical axis O in the perpendicular direction.

FIG. 23 shows lens data of the image display apparatus. In FIG. 23, data regarding the optical components s1 to s28 arranged from the primary image surface side to the secondary image surface side is shown. As the first lens group p1, s14 to s17 are used. As the second lens group p2, s20 and s21 are used.

FIG. 24 is a table showing an example of aspheric coefficients of optical components included in the projection optical system.

FIG. 25 is a table showing an example of parameters in the case of using the screen shift function. In FIG. 25, an example of the movement amount and movement direction (positive and negative represent the orientation) of the first and second lens groups p1 and p2 in the case where the screen to be projected on the screen or the like is shifted in the directions of the lower side, upper side, left side, lower left side, and upper left side is shown. For example, in the case of shifting the screen downward, the first lens group p1 is moved by 2.24 mm in the y axis direction, and the second lens group p2 is moved by 0.97 mm in the y axis direction. Unlike the case where the refractive powers of the lens groups have the same sign (see FIG. 8), the lens groups are moved in the same orientation in this case.

FIG. 26 is a table showing an example of parameters relating to the screen shift. The refractive power φ1 of the first optical system L1 is 0.032, and the first and second refractive powers φp1 and φp2 are 0.010 and −0.11, respectively. Further, the movement amount Mp1 of the first lens group p1 is 2.24 mm in the y direction, and the movement amount Mp2 of the second lens group p2 is 0.97 mm in the y direction. Although the movement amount in the y direction is shown as the movement amount of each lens group in FIG. 26, the lens group may be moved in any direction as long as the direction is perpendicular to the optical axis O. Note that the values shown in FIG. 26 correspond to the case where the screen shift is performed downward in FIG. 25.

FIG. 27 is a table showing an example of conditions of the parameters relating to the screen shift. φp1/φp2 relating to the above-mentioned conditional expression (1) is −1.06. Mp1/Mp2 relating to the above-mentioned conditional expression (2) is 2.30. φp1/φ1 and φp2/φ1 relating to the above-mentioned conditional expressions (3) and (4) are 0.36 and −0.36, respectively. As described above, the values shown in FIG. 27 satisfy the conditional expressions (1) to (4).

As described above, in this embodiment, the refractive powers of the two lens groups decentered with respect to the optical axis have different signs. Also in this case, by decentering the two lens groups in conjunction with each other, it is possible to, for example, adjust the image position while suppressing deterioration of the image. Accordingly, for example, in the case of incorporating the screen shift function or the like into the projection optical system, it is possible to perform designing with a high degree of freedom.

Third Embodiment

Figure 28:
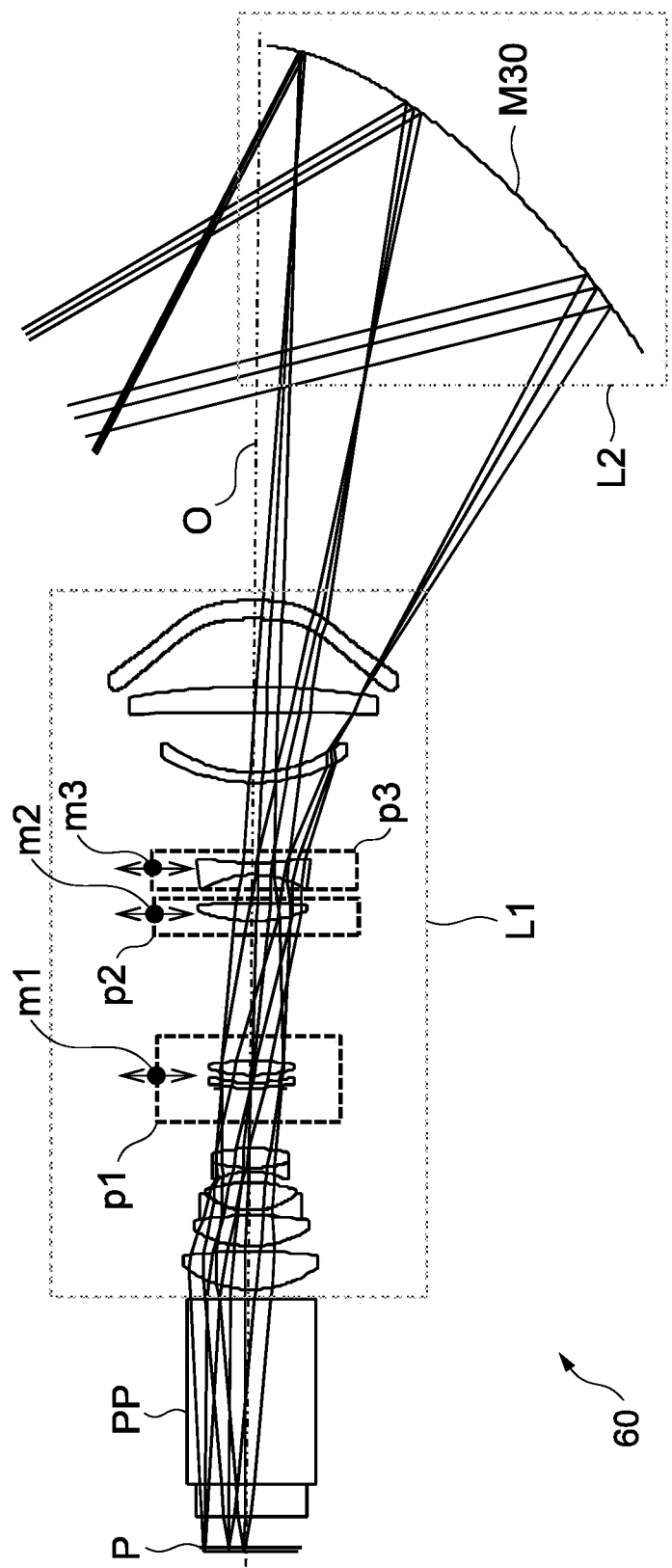
FIG. 28 is an optical path diagram showing a schematic configuration example of a projection optical system according to a third embodiment.

FIG. 28 is an optical path diagram showing a schematic configuration example of a projection optical system according to a third embodiment. As shown in FIG. 28, in a projection optical system 60 according to this embodiment, in addition to the first and second lens groups p1 and p2, a third lens group p3 is decentered with respect to the optical axis O.

The third lens group p3 has a third refractive power $\varphi p3$, and is moved along a direction substantially perpendicular to the optical axis O by a third movement mechanism m3. Accordingly, a screen shift function 3 is achieved. That is, in this embodiment, the entire image to be projected is moved with the screen shift functions 1 to 3 by movement of the first to third lens groups p1 to p3. Accordingly, it is possible to adjust the projection position in three stages.

Further, the first, second and third lens groups p1, p2, and p3 are moved so as to correct decentration aberration due to the decentration of the corresponding lens group. The present inventors have found the following conditional expressions (5) and (6) as conditions therefor.

That is, the projection optical system 60 is configured so that the first refractive power $\varphi p1$, the third refractive power $\varphi p3$, the movement amount Mp1 of the first lens group, and a movement amount Mp3 of the third lens group satisfy the following relationships of:

$$0.1 < |\varphi p1/\varphi p3| < 5.0; \text{ and} \quad (5)$$

$$0.1 < |Mp1/Mp3| < 20. \quad (6)$$

The above-mentioned conditional expression (5) appropriately define the first and third refractive powers $\varphi p1$ and $\varphi p3$ achieving the screen shift functions 1 and 3. In the case where the lower limit defined in the conditional expression (5) is not satisfied, correction of decentration aberration by the screen shift function 3 is excessive, which results in deterioration of the imaging performance. Further, in the case where the upper limit defined in the conditional expression (5) is exceeded, correction by the screen shift function 3 cannot be sufficiently performed, which results in deterioration of the imaging performance.

The above-mentioned conditional expression (6) appropriately define the movement amounts Mp1 and Mp3 in the direction substantially perpendicular to the optical axis O of the first and third lens group p1 and p3 achieving the screen shift functions 1 and 3. In the case where the lower limit defined in the conditional expression (6) is not satisfied, correction of decentration aberration by the screen shift function 3 is excessive, which results in deterioration of the imaging performance. Further, in the case where the upper limit defined in the conditional expression (6) is exceeded, correction by the screen shift function 3 cannot be sufficiently performed, which results in deterioration of the imaging performance.

Note that the conditions for achieving correction of decentration aberration is not limited to those described above. For example, the first lens group p1 is moved along a direction substantially perpendicular to the optical axis O by the largest amount, and the second lens group p2 along a direction substantially perpendicular to the optical axis O by the second largest amount. Further, the third lens group p3 is moved along a direction substantially perpendicular to the optical axis O by the third largest amount. Also in the case of adding these conditions, the decentration aberration due to the screen shift could be sufficiently corrected.

Further, for example, the range of the conditional expressions (5) and (6) may be narrowed. That is, the lower limit and the upper limit of the conditional expressions (5) and (6) may be changed to arbitrary values within the corresponding conditional expression so that desired characteristics are exhibited.

Now, the projection optical system 60 configured as described above will be simply described with specific numerical value examples.

The parameters relating to image projection of the projection optical system 60 are similar to those in the above-mentioned embodiment (see FIG. 4). That is, the numerical aperture NA on the primary image surface side is 0.163, the maximum half angle of view $\omega$ at the reference projection distance is 76°, and the maximum primary image surface height y is 13.6 mm.

Further, also the parameters relating to the liquid crystal panel P (image modulation devices) shown in FIG. 28 are similar to those in the above-mentioned embodiment (see FIG. 5). That is, the liquid crystal panel P has a rectangular shape with lengths of 16.6 mm in the lateral direction and 8.7 mm in the longitudinal direction, and has a screen center position at a position displaced by 6.4 mm from the optical axis O in the perpendicular direction.

FIG. 29 shows lens data of the image display apparatus. In FIG. 29, data regarding the optical components s1 to s28 arranged from the primary image surface side to the secondary image surface side is shown. As the first lens group p1, s14 to s17 are used. As the second lens group p2, s18 and s19 are used. Further, as the third lens group p3, s20 and s21 are used.

FIG. 30 is a table showing an example of aspheric coefficients of optical components included in the projection optical system.

FIG. 31 is a table showing an example of parameters in the case of using the screen shift function. In FIG. 31, an example of the movement amount and movement direction (positive and negative represent the orientation) of the first, second, and third lens groups p1, p2, and p3 in the case where the screen to be projected on the screen or the like is shifted in the directions of the lower side, upper side, left side, lower left side, and upper left side is shown. For example, in the case of shifting the screen downward, the first lens group p1 is moved by 1.99 mm in the y axis direction, the second lens group p2 is moved by −0.76 mm in the y axis direction, and the third lens group p3 is moved by 0.20 mm in the y axis direction.

FIG. 32 is a table showing an example of parameters relating to the screen shift. The refractive power $\varphi 1$ of the first optical system L1 at reference projection is 0.035, and the first, second, and third refractive powers $\varphi p1$, $\varphi p2$, and $\varphi p3$ are 0.011, 0.015, and −0.020, respectively. Further, the movement amount Mp1 of the first lens group p1 is 1.99 mm in the y direction, the movement amount Mp2 of the second lens group p2 is −0.76 mm in the y direction, and the movement amount Mp3 of the third lens group p3 is 0.20 mm in the y direction. Although the movement amount in the y direction is shown as the movement amount of each lens group in FIG. 32, the lens group may be moved in any direction as long as the direction is perpendicular to the optical axis O. Note that the values shown in FIG. 32 correspond to the case where the screen shift is performed downward in FIG. 31.

FIG. 33 is a table showing an example of conditions of the parameters relating to the screen shift. In FIG. 33, the parameters relating to the conditional expressions (1) to (4) described in the above-mentioned embodiment are shown. φp1/φp2 relating to the conditional expression (1) is 0.76. Mp1/Mp2 relating to the conditional expression (2) is −2.61. Further, φp1/φ1 and φp2/φ1 relating to the conditional expressions (3) and (4) are 0.33 and 0.43, respectively. As described above, the values shown in FIG. 33 satisfy the conditional expressions (1) to (4).

Further, in FIG. 33, the parameters relating to the above-mentioned conditional expressions (5) and (6) are shown. φp1/φp3 relating to the conditional expression (5) is −0.58. Mp1/Mp3 relating to the conditional expression (6) is 9.76. As described above, the values shown in FIG. 33 satisfy the conditional expressions (5) and (6).

As descried above, in this embodiment, by moving the three lens groups substantially perpendicular to the optical axis in conjunction with each other, the image to be projected is adjusted. Accordingly, for example, by using the third lens group p3, it is possible to, for example, correct decentration aberration on the image in which the image position or the like is adjusted by another lens group. Accordingly, it is possible to perform the screen shift or the like on the screen while sufficiently suppressing deterioration of the image. Note that the number of lens groups to be moved is not limited, and four or more lens groups may be decentered in conjunction with each other.

FIG. 34 is a table showing an example of parameters relating to the screen shift according to each embodiment. In FIG. 34, the refractive power of the first optical system described in the first, second, and third embodiments, and the refractive power and decentration amount of each lens group are shown.

FIG. 35 is a table showing an example of conditions relating to the screen shift according to each embodiment. In FIG. 35, parameters relating to the above-mentioned conditional expressions (1) to (6) are shown together with the corresponding lower limits and upper limits. Further, in FIG. 35, specific numerical values corresponding to the conditional expressions (1) to (6) calculated on the basis of the values shown in FIG. 34 are shown for each embodiment.

For example, |Mp1/Mp2| has the lower limit of 0.1 and the upper limit of 20 (conditional expression (2)). Further, the values of Mp1/Mp2 in the first, second, and third embodiment are −2.43, 2.30, and −2.61, respectively. The absolute values of these values satisfy the condition that it is larger than the lower limit (0.1) and smaller than the upper limit (20).

As described above, in the image display apparatus according to the present technology, each parameter is appropriately defined to exert functions such as the screen shift. For example, the first and second lens groups are appropriately selected so as to satisfy the conditional expressions (1), (3), and (4). Further, for example, the second lens group is decentered depending on the decentration amount of the first lens group so that the conditional expression (2) is satisfied. Accordingly, it is possible to sufficiently exert functions such as the screen shift while properly correcting deterioration of the imaging performance due to decentration aberration or the like.

With any of the configurations according to the first to third embodiments described above, it is possible to incorporate the high-performance screen shift function that does not deteriorate the image, or the like even in the case of supporting an ultra-wide angle in which the half angle of view is not less than 70°. Furthermore, it is possible to achieve such a function with a compact configuration and at low cost.

Other Embodiments

The present technology is not limited to the above-mentioned embodiments, and other various embodiments can be achieved.

The liquid crystal projector or the like that supports an ultra-wide angle is very sensitive to the installation environment. For example, such a situation that it reacts with vibration or the like that is not noticed by an apparatus that does not support an ultra-wide angle, and the projected screen shakes is assumed.

In this regard, an image display apparatus including the above-mentioned projection optical system may be provided with a mechanism that detects vibration or the like of the installation environment. For example, an infrared sensor or the like that detects vibration of the screen, a vibration sensor that detects the vibration of the apparatus itself, or the like is provided. The screen shift function of the image display apparatus is performed on the basis of the period, amplitude, and the like of the vibration detected by these sensors. Accordingly, it is possible to perform the screen shift so as to cancel the vibration in synchronization with the vibration of the installation environment. Accordingly, it is possible to correct the vibration of the screen to be projected, and maintain the image display with high quality.

The sensor that detects vibration, the synchronization method with the screen shift function, and the like are not limited. For example, the screen shift function may be synchronized using a camera shake correction technology used in an imaging system of a digital camera or the like.

At least two features of the above-mentioned features according to the present technology may be combined. Specifically, various features described in each embodiment may be arbitrarily combined without distinguishing the embodiments with each other. Further, the various effects described above are merely examples and are not limited, and additional effects may be exerted.

It should be noted that the present technology may take the following configurations.

(1) An image display apparatus, including:
a light source;
an image generation unit that generates image light by modulating a light beam emitted from the light source; and
a projection optical system including
a first lens group that is disposed on an optical axis of the generated image light and has a first refractive power,
a second lens group that is disposed on the optical axis and has a second refractive power,
a first movement mechanism that moves the first lens group, and
a second movement mechanism that moves the second lens group corresponding to the first refractive power, the second refractive power, and the movement of the first lens group.

(2) The image display apparatus according to (1), in which
the first movement mechanism moves the first lens group in a first orientation along a direction substantially perpendicular to the optical axis, and
the second movement mechanism moves the second lens group in a second orientation corresponding to the first refractive power, the second refractive power, and the first orientation along the direction substantially perpendicular to the optical axis.

(3) The image display apparatus according to (2), in which the second orientation is opposite to the first orientation in a case where the first and second refractive powers have the same sign.

(4) The image display apparatus according to (2), in which the second orientation is the same orientation as the first orientation in a case where the first and second refractive powers have different signs.

(5) The image display apparatus according to any one of (1) to (4), in which the projection optical system includes a first optical system that includes the first and second lens groups and has a positive refractive power as a whole, and a second optical system that includes a concave reflecting surface reflecting the image light emitted from the first optical system.

(6) The image display apparatus according to (5), in which the projection optical system is configured so that the first refractive power $\varphi p1$, the second refractive power $\varphi p2$, a refractive power $\varphi 1$ of the first optical system at reference projection, a movement amount $Mp1$ of the first lens group, and a movement amount $Mp2$ of the second lens group satisfy relationships of $$0.1 < |\varphi p1/\varphi p2| < 5.0, \tag{1}$$

$$0.1 < |Mp1/Mp2| < 20, \tag{2}$$

$$0.1 < |\varphi p1/\varphi 1| < 5.0, \text{ and} \tag{3}$$

$$0.1 < |\varphi p2/\varphi 1| < 5.0. \tag{4}$$

(7) The image display apparatus according to (6), in which the first lens group is moved along a direction substantially perpendicular to the optical axis by the largest amount, and the second lens group is moved along the direction substantially perpendicular to the optical axis by the second largest amount.

(8) The image display apparatus according to any one of (1) to (7), in which the first and second movement mechanisms move the first and second lens groups in conjunction with each other.

(9) The image display apparatus according to any one of (1) to (8), in which the first optical system includes at least one lens group that is moved along a direction substantially in parallel with the optical axis, and the first and second movement mechanisms move the first and second lens groups in conjunction with the movement of the at least one lens group along the direction substantially in parallel with the optical axis.

(10) The image display apparatus according to any one of (5) to (9), in which the projection optical system includes a third lens group that is included in the first optical system and has a third refractive power, and a third movement mechanism that moves the third lens group.

(11) The image display apparatus according to (10), in which the projection optical system is configured so that the first refractive power $\varphi p1$, the third refractive power $\varphi p3$, a movement amount $Mp1$ of the first lens group, and a movement amount $Mp3$ of the third lens group satisfy relationships of $$0.1 < |\varphi p1/\varphi p3| < 5.0, \text{ and} \tag{5}$$

$$0.1 < |Mp1/Mp3| < 20. \tag{6}$$

(12) The image display apparatus according to (11), in which the first lens group is moved along a direction substantially perpendicular to the optical axis by the largest amount, the second lens group is moved along the direction substantially perpendicular to the optical axis by the second largest amount, and the third lens group is moved along the direction substantially perpendicular to the optical axis by the third largest amount.

REFERENCE SIGNS LIST p1 first lens group
p2 second lens group
p3 third lens group
$\varphi p1$ first refractive power
$\varphi p2$ second refractive power
$\varphi p3$ third refractive power
m1 first movement mechanism
m2 second movement mechanism
m3 third movement mechanism
L1 first optical system
L2 second optical system
$\varphi 1$ refractive power of first optical system at reference projection
M30 concave reflecting surface
O optical axis
10 light source
20 illumination optical system
30, 50, 60 projection optical system
100 image display apparatus

The invention claimed is:

1. An image display apparatus, comprising:
a light source;
an image generation unit that generates image light by modulating a light beam emitted from the light source; and
a projection optical system including
a first lens group that is disposed on an optical axis of the generated image light and has a first refractive power,
a second lens group that is disposed on the optical axis and has a second refractive power,
a first movement mechanism that moves the first lens group, and
a second movement mechanism that moves the second lens group based on the first refractive power, the second refractive power, and the movement of the first lens group.

2. The image display apparatus according to claim 1, wherein
the first movement mechanism moves the first lens group in a first orientation along a direction substantially perpendicular to the optical axis, and
the second movement mechanism moves the second lens group in a second orientation based on the first refractive power, the second refractive power, and the first orientation along the direction substantially perpendicular to the optical axis.

3. The image display apparatus according to claim 2, wherein the second orientation is opposite to the first orientation in a case where the first and second refractive powers have the same sign.

4. The image display apparatus according to claim 2, wherein the second orientation is the same orientation as the first orientation in a case where the first and second refractive powers have different signs.

5. The image display apparatus according to claim 1, wherein the projection optical system includes a first optical system that includes the first and second lens groups and has a positive refractive power as a whole, and a second optical system that includes a concave reflecting surface reflecting the image light emitted from the first optical system.

6. The image display apparatus according to claim 5, wherein the projection optical system is configured so that the first refractive power $\varphi p1$, the second refractive power $\varphi p2$, a refractive power $\varphi 1$ of the first optical system at reference projection, a movement amount Mp1 of the first lens group, and a movement amount Mp2 of the second lens group satisfy relationships of $$0.1 < |\varphi p1/\varphi p2| < 5.0, \tag{1}$$

$$0.1 < |Mp1/Mp2| < 20, \tag{2}$$

$$0.1 < |\varphi p1/\varphi 1| < 5.0, \text{ and} \tag{3}$$

$$0.1 < |\varphi p2/\varphi 1| < 5.0 \tag{4}.$$

7. The image display apparatus according to claim 6, wherein
the first lens group is moved along a direction substantially perpendicular to the optical axis by the largest amount, and
the second lens group is moved along the direction substantially perpendicular to the optical axis by the second largest amount.

8. The image display apparatus according to claim 1, wherein the first and second movement mechanisms move the first and second lens groups in conjunction with each other.

9. The image display apparatus according to claim 1, wherein
the first optical system includes at least one lens group that is moved along a direction substantially in parallel with the optical axis, and
the first and second movement mechanisms move the first and second lens groups in conjunction with the movement of the at least one lens group along the direction substantially in parallel with the optical axis.

10. The image display apparatus according to claim 5, wherein the projection optical system includes a third lens group that is included in the first optical system and has a third refractive power, and a third movement mechanism that moves the third lens group.

11. The image display apparatus according to claim 10, wherein the projection optical system is configured so that the first refractive power $\varphi p1$, the third refractive power $\varphi p3$, a movement amount Mp1 of the first lens group, and a movement amount Mp3 of the third lens group satisfy relationships of $$0.1 < |\varphi p1/\varphi p3| < 5.0, \text{ and} \tag{5}$$

$$0.1 < |Mp1/Mp3| < 20 \tag{6}.$$

12. The image display apparatus according to claim 11, wherein
the first lens group is moved along a direction substantially perpendicular to the optical axis by the largest amount,
the second lens group is moved along the direction substantially perpendicular to the optical axis by the second largest amount, and
the third lens group is moved along the direction substantially perpendicular to the optical axis by the third largest amount.

13. A projection optical system that projects image light obtained by modulating a light beam emitted from a light source, the projection optical system comprising:
a first lens group that is disposed on an optical axis of the image light and has a first refractive power;
a second lens group that is disposed on the optical axis and has a second refractive power;
a first movement mechanism that moves the first lens group; and
a second movement mechanism that moves the second lens group based on the first refractive power, the second refractive power, and the movement of the first lens group.

* * * * *